United States Patent [19]

Furihato et al.

[11] 4,328,513

[45] May 4, 1982

[54] SYNCHRONIZING SIGNAL GENERATOR DEVICE FOR TELEVISION

[75] Inventors: Makoto Furihata, Tachikawa; Toyotaka Machida, Kashiwa; Yuichi Ikemura, Nagareyama, all of Japan

[73] Assignees: Hitachi, Ltd.; Victor Company of Japan, Ltd., both of Japan

[21] Appl. No.: 140,838

[22] Filed: Apr. 16, 1980

[30] Foreign Application Priority Data

Apr. 20, 1979 [JP] Japan ............................... 54-47910

[51] Int. Cl.³ ..................... H04N 9/46; H04N 5/06
[52] U.S. Cl. .................................. 358/19; 358/150
[58] Field of Search .................. 358/17, 19, 149, 150

[56] References Cited
U.S. PATENT DOCUMENTS 4,038,683 7/1977 Thorpe et al. .................... 358/19

*Primary Examiner*—John C. Martin

*Attorney, Agent, or Firm*—Craig and Antonelli

[57] ABSTRACT

A synchronizing signal generator device for television includes an oscillator circuit which generates a color subcarrier signal, a voltage-controlled oscillator circuit which includes a counter and whose oscillation frequency is controlled by the output signal of the first-mentioned oscillator circuit, a counter which receives an output of the voltage-controlled oscillator circuit, and a decoder which receives an output of the second-mentioned counter. The decoder provides a synchronizing signal for the NTSC, PAL or SECAM format in such a manner that the count numbers of the respective counters are controlled. The synchronizing signal generator device for television also includes various circuits for receiving external synchronizing signals. As a result, the synchronizing signal generator device for television can be synchronized with another synchronizing signal generator device for television.

9 Claims, 22 Drawing Figures

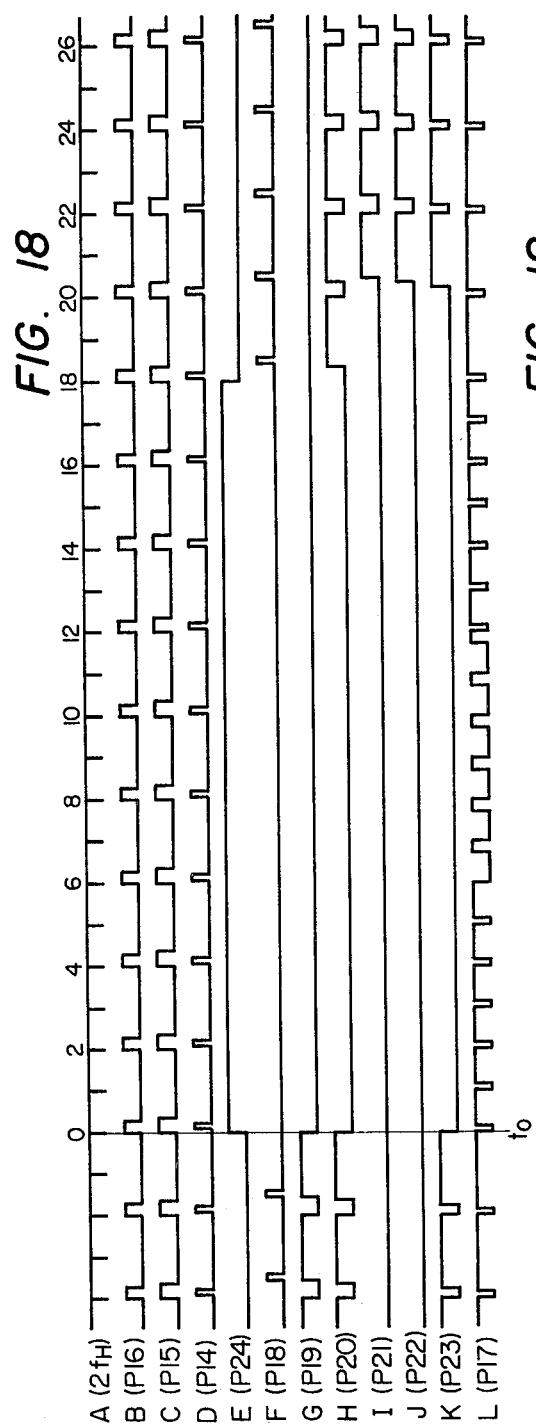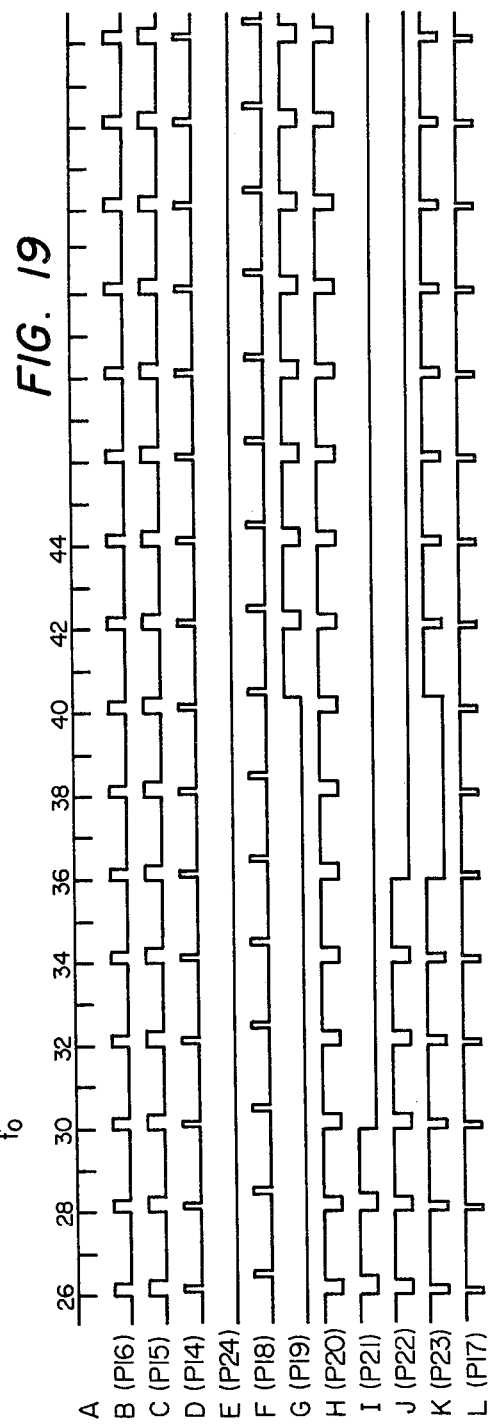

SYNCHRONIZING SIGNAL GENERATOR DEVICE FOR TELEVISION

BACKGROUND OF THE INVENTION

This invention relates to a synchronizing signal generator device for use in television broadcasts.

In television broadcast equipment such as a television camera, a synchronizing signal generator device is used for generating various signals of a subcarrier signal, a horizontal synchronizing signal, a vertical synchronizinc signal, etc. which serve as the reference of a television broadcast. In this case, in order to render the television broadcast equipment low in cost and high in density, the synchronizing signal generator device should desirably be constructed so that the various signals may be produced through signal combinations etc. with reference to a single stabilized oscillation signal.

Here, in contrast to a case of using only one television camera by way of example, when two or more television cameras are used the various signals in one television camera need to be synchronous with those in the other television camera or cameras.

The synchronizing signal generator device therefore needs to be constructed so as to operate in synchronism with a synchronizing signal supplied externally.

Further, since there are various television systems such as NTSC, PAL and SECAM, the synchronizing signal generator device should desirably have a construction which can be readily modified for the various systems.

SUMMARY OF THE INVENTION

It is accordingly an object of this invention to provide a synchronizing signal generator device which can be readily modified for various television systems by some changes of circuitry.

Another object of this invention is to provide a synchronizing signal generator device which can operate in synchronism with a synchronizing signal supplied externally.

Another object of this invention is to provide a synchronizing signal generator device which operates so as to reduce synchronization errors.

Another object of this invention is to provide a synchronizing signal generator device which can produce a plurality of color subcarrier signals having their phases compensated for one another.

Another object of this invention is to provide a synchronizing signal generator circuit which is suited to the form of a semiconductor integrated circuit.

Further objects and effects of this invention will become apparent from the following description taken with reference to the drawings.

BRIEF DESCRIPTION OF THE DRAWINGS

FIG. 9A is a logic circuit diagram of a read only memory, while FIG. 9B is a detailed circuit diagram corresponding to FIG. 9A.

FIGS. 18 and 19 are timing charts of the circuit in FIG. 1.

DESCRIPTION OF THE PREFERRED EMBODIMENTS

Figure 1:
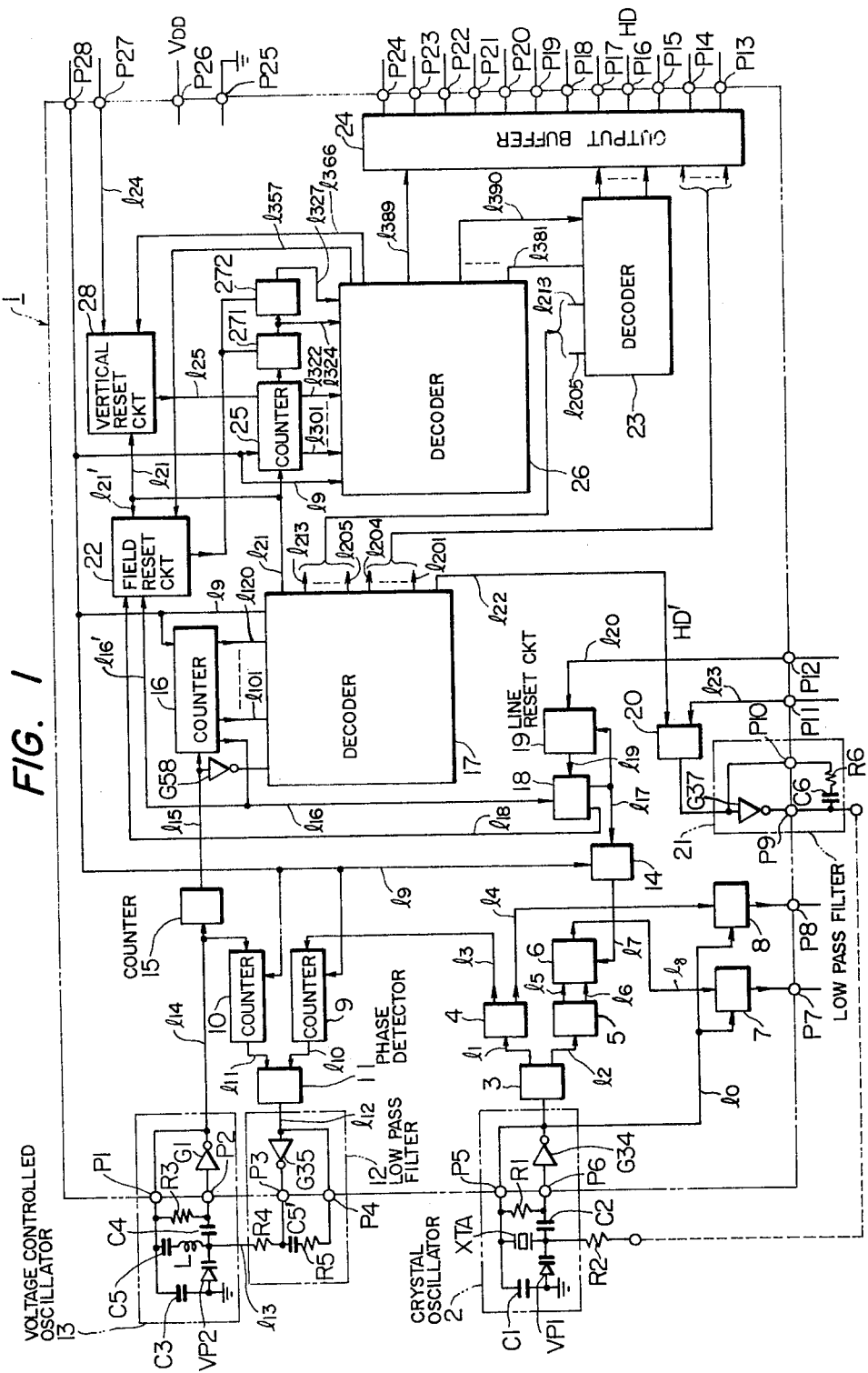
FIG. 1 is a block diagram of a device of an embodiment of this invention.

FIG. 1 shows a block diagram of an embodiment of this invention. In the figure, a portion enclosed with a two-dot chain line 1 is constructed in the form of a semiconductor integrated circuit device made up of complementary type insulated gate field effect transistors (CMOSIC) though it is not especially restricted to this construction. Parts P1 to P28 form external terminals of the CMOSIC.

A block 2 indicated by a broken line is a crystal oscillator circuit. It is composed of an inverter G34 operating as an amplifier circuit, a capacitor C1, a quartz crystal unit XTA, a varactor diode VP1, an A.C. coupling capacitor C2, and a resistor R1 for supplying a D.C. bias voltage to the input terminal of the inverter G34.

Across the input terminal and output terminal of the inverter G34, the bias resistor R1 is connected through the external terminals P5 and P6 shown in the figure. As a result, the inverter G34 has its input terminal self-biased by an output potential at its output terminal. Owing to the self-bias, the inverter G34 executes an amplifying operation at a desirable operating point in spite of a deviation or dispersion in the characteristics thereof.

The capacitor C1, the quartz crystal unit XTA, the varactor diode VP1 and the A.C. coupling capacitor C2 constitute a feedback circuit for the inverter G34. The input terminal of the inverter G34 is supplied with a positive feedback signal corresponding to a signal at the output terminal of the inverter G34 at the resonance frequency of the quartz crystal unit XTA of the feedback circuit.

As a result, the crystal oscillator circuit 2 executes an oscillating operation at the resonance frequency of the quartz crystal unit XTA. The output terminal of the inverter G34 as the output terminal of the crystal oscillator circuit 2 delivers an oscillation output signal of a waveform as shown at A in FIG. 8.

As will be elucidated later, the oscillation output signal of the crystal oscillator circuit 2 has its frequency divided by 4 (four) is thus converted into a color subcarrier signal.

Accordingly, the quartz crystal unit XTA to be used in the crystal oscillator circuit 2 has a characteristic with a pole at a frequency four times higher than a color subcarrier frequency (hereinbelow, written "$f_{SC}$"). In case of, for example, the NTSC format, $f_{SC}$ is 3.579545 MHz, so that the pole of the crystal unit XTA ought to lie at 14.31818 MHz.

The capacitance of the varactor diode VP1 in the crystal oscillator circuit 2 varies in accordance with the terminal voltage thereof.

Accordingly, the oscillation frequency of the crystal oscillator circuit 2 is controlled by applying a control voltage to the cathode of the varactor diode VP1 through a resistor R2.

Such control of the oscillation frequency is required when the operation of the device in FIG. 1 is to be synchronized with the operation of another device not shown. The control voltage for controlling the oscillation frequency is fed from a circuit 21 to be described later.

In case where the synchronization as above described is unnecessary, the control voltage is made a fixed voltage. Such fixed voltage can be provided from, for example, a voltage dividing resistance circuit (not shown) receiving a predetermined reference voltage. The oscillation frequency in this case is adjusted by adjusting the fixed voltage.

Sine the A.C. coupling capacitor C2 is used in the crystal oscillator circuit 2, the input bias voltage of the inverter G34 is held constant even when the bias voltage of the varactor diode VP1 has changed.

Numeral 3 designates a binary counter which receives the oscillation output signal of the crystal oscillator circuit 2. Numeral 4 indicates a binary counter which receives the non-inverted output of the binary counter 3 through a line $l_1$, while numeral 5 indicates a binary couner which receives the inverted output of the binary counter 3 through a line $l_2$.

Each of the binary counters 3 to 5 is constructed so as to inert its output by means of the negative edge of its input signal.

Figure 8:
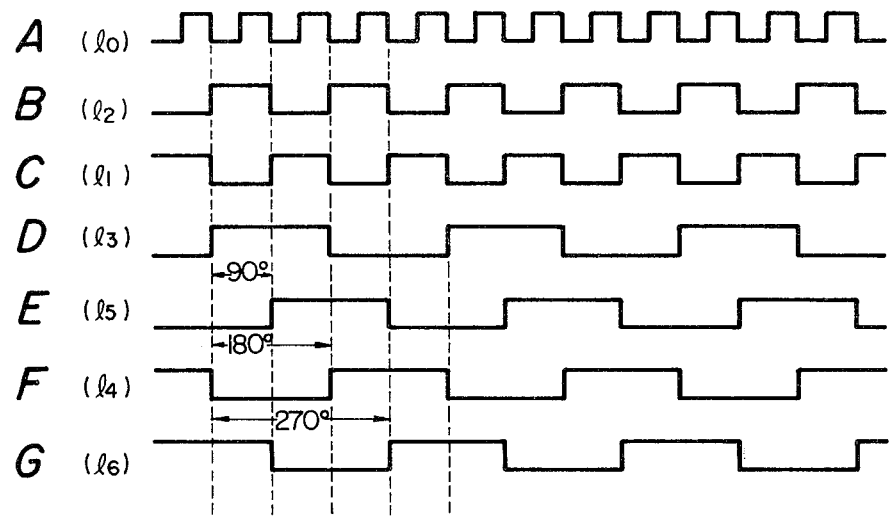
FIG. 8 is a timing chart of blocks 3 to 6 in FIG. 1.

Accordingly, the binary counter 3 receives from the oscillator circuit 2 the signal of the frequency $4 \cdot f_{SC}$ as shown at A in FIG. 8 and thus delivers to the lines $l_1$ and $l_2$ the signals of a frequency $2 \cdot f_{SC}$ having phases opposite to each other as shown at C and B in FIG. 8 respectively.

In response to the signal received through the line $l_1$, the binary couter 4 supplies lines $l_3$ and $l_4$ with signals of the frequency $f_{SC}$ having phases opposite to each other as shown at D and F in FIG. 8 respectively. Likewise, the binary counter 5 supplies lines $l_5$ and $l_6$ with signals as shown at E and G in FIG. 8 respectively. Consequently, the signals on the lines $l_4$, $l_5$ and $l_6$ have phase differences of 180°, 90° and 270° with respect to the signal on the line $l_3$ respectively.

Numeral 6 indicates a transfer gate, which transmits the signal on either the line $l_5$ or $l_6$ to a line $l_8$ in accordance with a gate signal that is supplied through a line $l_7$ from a circuit 14 to be described later. In case of the NTSC format, the gate signal is fixed to either level by the circuit 14, with the result that the signal with the phase shift of 90° on the line $l_5$ is transmitted to the line $l_8$. In case of the PAL format, the gate signal is inverted every horizontal flyback time by the circuit 14, with the result that the signal with the phase shift of 90° on the line $l_5$ and the signal with the phase shift of 270° on the line $l_6$ are transmitted to the line $l_8$ alternately every second horizontal flyback time.

The signals on the lines $l_8$ and $l_4$ are utilized as the color subcarrier signals.

It is accordingly desirable that the phase difference between the signal on the line $l_4$ and the signal on the line $l_8$ is exactly 90°.

However, the non-inverted output signal and inverted output signal of the binary counter 3 do not always begin to change simultaneously with each other by various causes. Similarly, the non-inverted output signal and inverted output signal of each of the binary counters 4 and 5 receiving the output signals of the counter 3 do not always begin to change simultaneously with each other.

Further, the transfer gate 6 which receives the output signal of the binary counter 5 gives rise to a delay of the signal.

As a result, the phase difference between the signal on the line $l_4$ and the signal on the line $l_8$ does not become exactly 90°.

In this embodiment, delay means 7 and 8 driven by the output signal of the oscillator circuit 2 are disposed in order to provide signals of desirable phases at the external terminals P7 and P8 of the CMOSIC 1 irrespective of the changes of the signal phases caused by the aforecited reasons.

Although not especially restricted, the delay means 7 and 8 are constructed of delay-type flip-flop circuits which have the same arrangement. Each of the flip-flop circuits 7 and 8 receives the oscillation output from the oscillator circuit 2 as a clock signal, and delivers the output signal corresponding to the input signal at a timing synchronous with the clock signal. As a result, the flip-flop circuits 7 and 8 provide the color subcarrier signals which have had their times corrected, i.e., their phases corrected, by the clock signal.

Numeral 9 denotes a counter which receives the output from the binary counter 4 as a count signal through the line $l_3$.

Numeral 10 denotes a counter which receives an output from a voltage-controlled oscillator circuit 13 as a count signal through a line $l_{14}$.

Numeral 11 denotes a phase detector circuit which receives outputs from the counters 9 and 10 through lines $l_{10}$ and $l_{11}$ respectively.

Numeral 12 is a low-pass filter which receives an output from the phase detector 11, and which is composed of an inverter G35, a resistor R5 and a capacitor C5' as shown in the figure.

The voltage-controlled oscillator circuit 13 is composed of an inverter G1, capacitors C3 to C5, a resistor R3 and a varactor diode VP2. The oscillation frequency of the voltage-controlled oscillator circuit 13 is varied in accordance with an output voltage which is supplied from the low-pass filter 12 through a resistor R4.

The counter 10, the phase detector circuit 11, the low-pass filter 12 and the voltage-controlled oscillator circuit 13 constitute a phase locked loop.

The counters 9 and 10 constitute a programmable counter. The respective count values of the two counters 9 and 10 are controlled by a signal which is applied through a line $l_9$ from the terminal P28.

The terminal P28 is supplied with a signal of low level in case of operating the device of FIG. 1 as a device for the NTSC format, and with a signal of high level in case of operating it as a device for the PAL format or the SECAM format.

The counter 9 is constructed so as to operate as a divide-by-161 counter in case where the NTSC format is indicated by the control signal at the terminal P28, and so as to operate as a divide-by-162 counter in case where the PAL format or the SECAM format is indicated.

The counter 10 is constructed so as to operate as a divide-by-184 counter in case where the NTSC format is indicated, and so as to operate as a divide-by-161 counter in case where the PAL format or the SECAM format is indicated.

Figure 2:
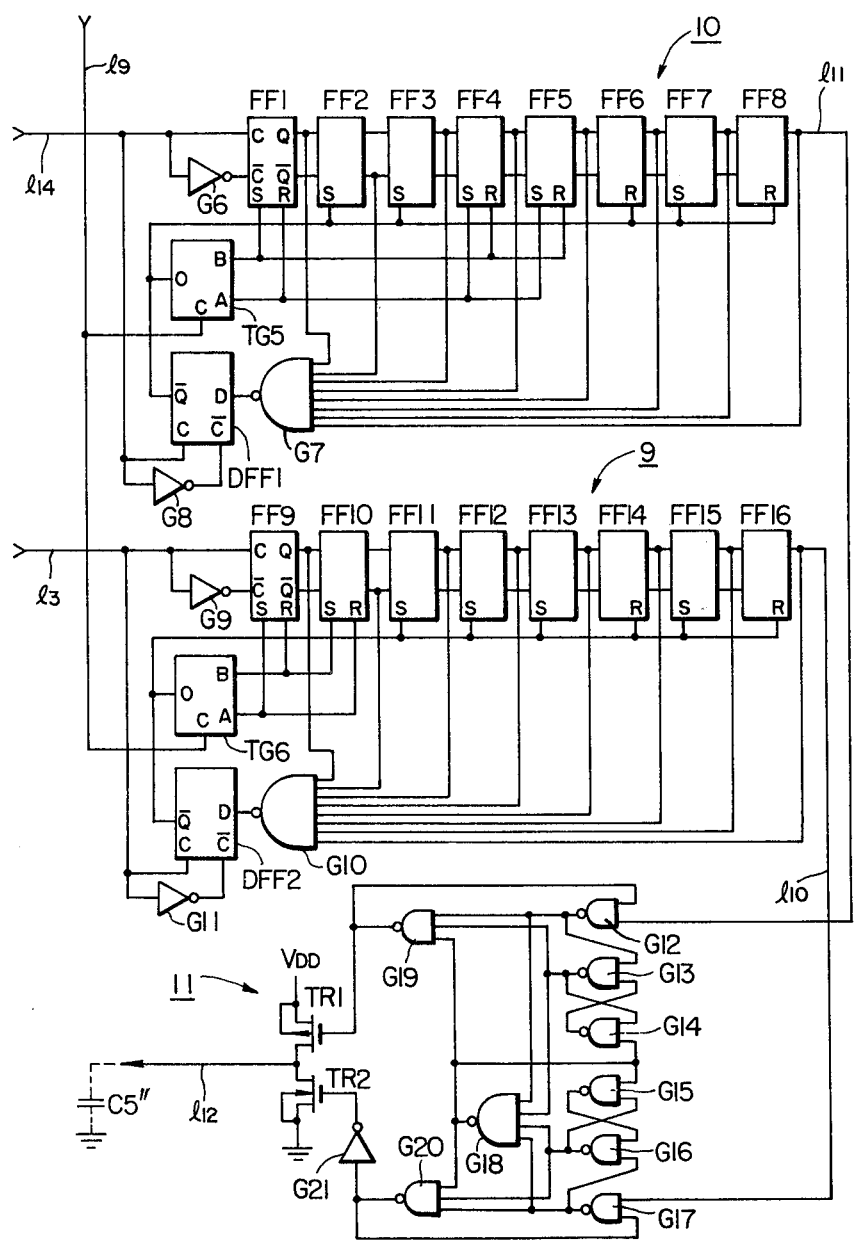
FIGS. 2 to 7 are detailed circuit diagrams of various parts in the block diagram of FIG. 1.

Although not especially restricted, concrete logic circuitry which constructs the counters 9 and 10 and the phase detector circuit 11 is shown in FIG. 2.

Referring to FIG. 2, the counter 9 is composed of flip-flop circuits FF9 to FF16 which invert non-inverting outputs Q and inverting outputs $\bar{Q}$ thereof in synchronism with the negative edge of the input signal applied to input terminals C thereof, a delay-type flip-flop circuit DEF2 which inverts a signal having been applied to its input terminal D and provides the inverted signal at its inverting output $\bar{Q}$ in synchronism with the negative edge of the clock signal applied to its clock terminal C, a transfer gate TG6 which transfers a signal at its terminal O to its terminal B when the signal applied to its control terminal C through the line $l_9$ is at the low level and which transfers the signal at its terminal O to its terminal A when the signal applied to the control terminal C is at the high level contrariwise, a NAND circuit G10, and inverters G9 and G11. In the flip-flop circuits FF9 to FF16, letter S indicates a set terminal and letter R a reset terminal.

The operation of the counter 9 is as stated below. In the following description, the signal on the line $l_9$ is assumed to lie at the level of the NTSC format, that is, the low level. It is also assumed that the inverting output $\bar{Q}$ of the delay-type flip-flop circuit DFF2 is held at the high level in the initial state.

The reset terminal R of the flip-flop circuit FF9 and the set terminal S of the flip-flop circuit FF10 are supplied with the inverted output signal $\bar{Q}$ of the delay-type flip-flop circuit DFF2 through the transfer gate TG6. The set terminals S or reset terminals R of the flip-flop circuits FF11 and FF16 are directly supplied with the inverted output signal $\bar{Q}$ of the delay-type flip-flop circuit DFF2.

Accordingly, the high level of the inverted output signal Q of the delay-type flip-flop circuit DFF2 in the initial state sets the flip-flop circuits FF10, FF11 to FF13 and FF15 and resets the remaining flip-flop circuits FF9, FF14 and FF16.

Since at least one among the non-inverted output signals of the flip-flop circuits FF9 and FF11 to FF16 and the inverted output signal of the flip-flop circuit FF10 becomes the low level, the NAND circuit G10 provides an output signal of high level.

The first signal is supplied from the oscillator circuit 2 (refer to FIG. 1) to the line $l_3$. In this case, the output signal of the NAND circuit G10 is at the high level, so that the inverted output signal $\bar{Q}$ of the delay-type flip-flop circuit DFF2 changes from the high level to the low level in synchronism with the trailing edge of the first signal. As a result, the forced set states and reset states of the flip-flop circuits FF9 to FF16 are released.

The second signal is supplied to the line $l_3$. The non-inverted output signal of the flip-flop circuit FF9 at the first stage is changed from the low level to the high level in synchronism with the trailing edge of the second signal.

The third signal is supplied to the line $l_3$. The non-inverted output signal of the flip-flop circuit FF9 is changed to the low level again in synchronism with the trailing edge of the third signal. The non-inverted output signal of the flip-flop circuit FF10 at the second stage as put into the high level in advance is changed to the low level upon the fall of the output signal of the flip-flop circuit FF9. Similarly, the output signals of the flip-flop circuits FF11 to FF14 are inverted upon the fall of the output signals of the flip-flop circuits at the respectively preceding stages.

In the same manner, the output signals of the flip-flop circuits FF9 to FF16 are changed by signals after the third one as are supplied to the line $l_3$.

The non-inverting outputs of the flip-flop circuits FF9 and FF11 to FF16 and the inverting output of the flip-flop circuit FF10 are brought into the high level by the 159th signal supplied to the line $l_3$. As a result, the output signal of the NAND circuit G10 is changed from the high level to the low level.

Since the output signal of the NAND circuit G10 has been made the low level, the inverting output $\bar{Q}$ of the delay-type flip-flop circuit DFF2 is changed to the high level in synchronism with the trailing edge of the 160th signal supplied to the line $l_3$. As a result, the flip-flop circuits FF9 and FF16 are returned to the initial states as stated before.

Thus, the counter 9 operates as the divide-by-161 counter.

If the signal on the line $l_9$ is at the high level, the input terminal O and output terminal A of the transfer gate TG6 are coupled, and hence, the counter 9 operates as the divide-by-162 counter.

The counter 10 has a construction similar to that of the counter 9. It is composed of flip-flop circuits FF1 to FF8, a delay-type flip-flop circuit DFF1, a transfer gate TG5, a NAND circuit G7, and inverters G6 and G8.

The phase detector circuit 11 is composed of NAND circuits G12 to G20, an inverter G21, a P-channel MOSFET TR1, and an N-channel MOSFET TR2.

The phase detector circuit 11 varies the alternate conduction time lengths of the MOSFETs TR1 and TR2, depending upon the phase difference between the output signals of the counters 9 and 10 applied through the lines $l_{10}$ and $l_{11}$.

Accordingly, the average value of output signals supplied from the MOSFETs TR1 and TR2 to a line $l_{12}$ is varied in accordance with the phase difference. In FIG. 2, an equivalent input capacitance C5" of the low-pass filter 12 in FIG. 1 is shown.

The output voltage of the low-pass filter 12 in FIG. 1 is varied in correspondence with the average value of the output signals on the line $l_{12}$.

The capacitance across the terminals of the varactor diode VP2 in the voltage-controlled oscillator circuit 13 is controlled by the output voltage of the low-pass filter 12. In consequence, the oscillation frequency of the voltage-controlled oscillator circuit 13 is controlled by the output signal of the phase detector circuit 11.

By way of example, in case where the phase of the output signal of the counter 10 leads over that of the output signal of the counter 9, the average value of the output signals which are delivered from the phase detector circuit 11 in FIG. 2 to the line $l_{12}$ is raised, so that the output voltage of the low-pass filter 12 is lowered. The lowering of the output voltage of the low-pass filter 12 increases the terminal capacitance of the varactor diode VP1. The increase of the terminal capacitance of the varactor diode VP1 lowers the oscillation frequency of the voltage-controlled oscillator circuit 13. As a result, the phase of the output signal of the counter 10 is delayed.

As apparent from the control operation described above, the oscillation frequency of the voltage-controlled oscillator circuit 13 is a value which is determined by the frequency of the signal supplied through the line $l_3$ and the frequency division ratios of the counters 9 and 10.

In case where the NTSC format is indicated, the counter 9 operates as the divide-by-161 counter and the counter 10 as the divide-by-184 counter, so that the oscillation frequency $f_{OSC}$ of the voltage-controlled oscillator circuit 13 becomes a value as given in the following expression (1). Since, in the NTSC format, the frequency $f_H$ of the horizontal synchronizing signal is defined as a relationship given in the following expression (2), the frequencies $f_{OSC}$ and $f_H$ are in a relationship given in the following expression (3).

$$f_{OSC} = (184/161) \cdot f_{SC} \qquad (1)$$

$$f_H = (2/455) \cdot f_{SC} \qquad (2)$$

$$f_{OSC} = 260 \cdot f_H \qquad (3)$$

Likewise, in case where the PAL format or the SECAM format is indicated, $f_{OSC}$ and $f_H$ become as given in the following expressions (4) to (6).

$$f_{OSC} = (161/162) \cdot f_{SC} \qquad (4)$$
$$f_H = [4/(1135 = 4/625)] \cdot f_{SC} \qquad (5)$$

$$f_{OSC} \approx 282 \cdot f_H \qquad (6)$$

In the case of the NTSC format, the frequency $f_{SC}$ of the subcarrier signal is made 3.579545 MHz as mentioned previously, so that the frequency $f_H$ of the horizontal synchronizing signal obtained on the basis of Expression (2) is 15734/26 Hz.

In the case of the PAL format, $f_{SC}$ is made 4.43361875 MHz, so that $f_H$ obtained on the basis of Expression (5) is 15625.0026 Hz.

The clock signal at 260 $f_H$ or 282 $f_H$ produced by the voltage-controlled oscillator circuit 13 is applied to a flip-flop circuit 15 constructing a binary counter, and is converted into a clock signal at 130 $f_H$ or 141 $f_H$ by means of the flip-flop circuit 15.

The output signal of the flip-flop circuit 15 is applied to a counter 16, and is also applied to a decoder 17 through an inverter G58.

The counter 16 is operated as a divide-by-130 counter when the NTSC format is appointed by the low level of the control signal applied to the line l9 through the terminal P28, and it is operated as a divide-by-141 counter when the PAL format or the SECAM format is appointed by the high level of the control signal. Accordingly, one period of the counter 16 forms one cycle of the horizontal synchronizing signal.

Figure 3:
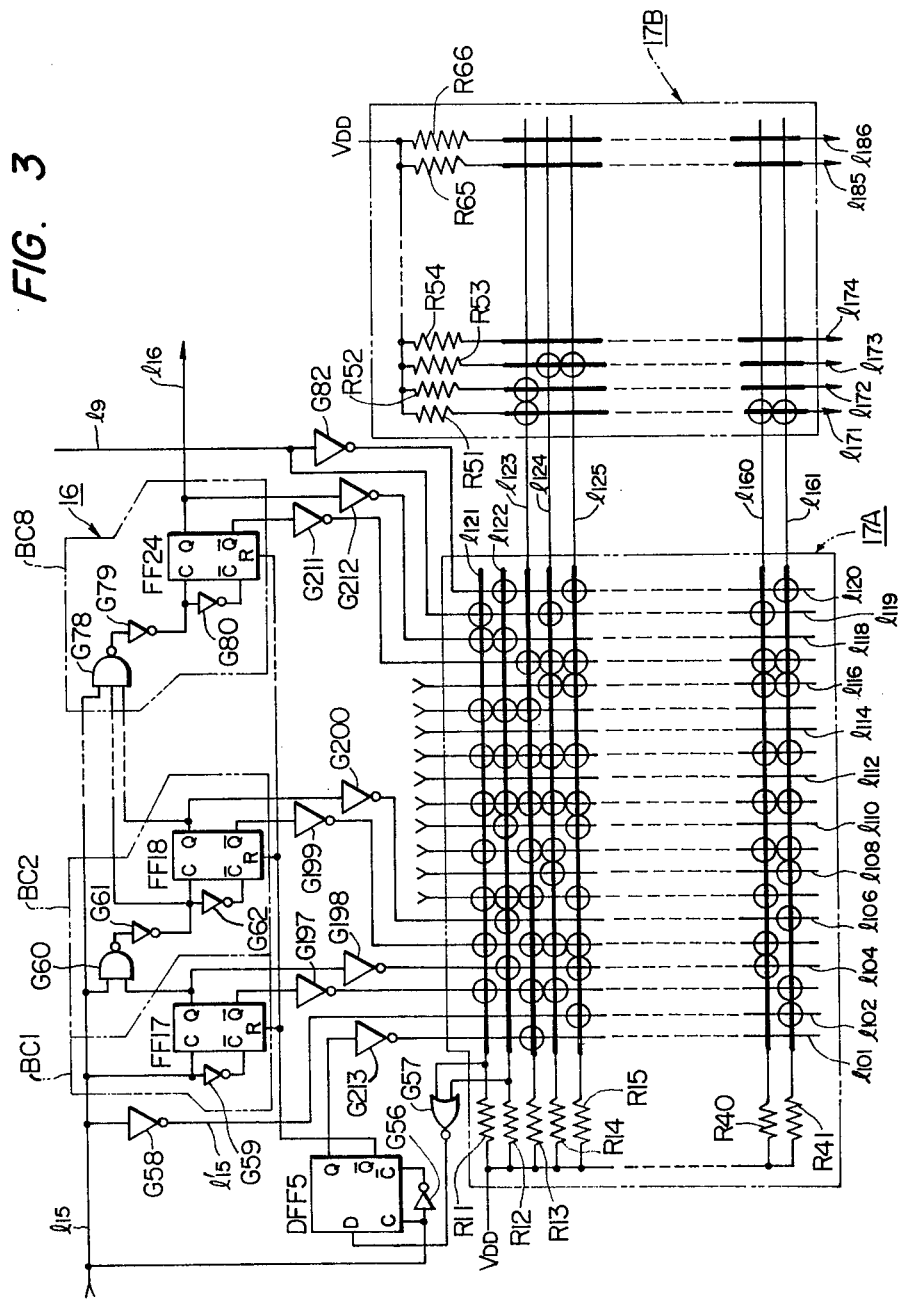

A detailed circuit diagram of the counter 16 as well as the decoder 17 is shown in FIG. 3.

Although not especially restricted, the counter 16 is composed of binary counters BC1 to BC8 connected in series, a delay-type flip-flop circut DFF5, an inverter G56, a NOR circuit G57, and a part of the decoder 17.

The binary counter BC1 is constructed of an inverter G59 and a flip-flop FF17. The binary counter BC2 is constructed of a NAND circuit G60, inverters G61 and G62, and a flip-flop circuit FF18. Although not shown, each of the binary counters BC3 to BC7 has the same construction as that of the binary counter BC8 composed of a NAND circuit G78, inverters G79 and G80 and a flip-flop circuit FF24.

The decoder 17 is constructed of read only memories (hereinbelow, abbreviated to "ROMs") 17A and 17B, and a group of R-S flip-flop circuits 17C shown in FIG. 5.

Figure 9:
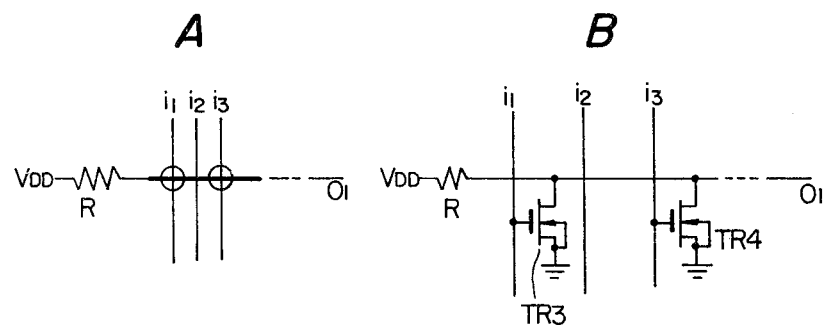

In the ROMs 17A and 17B, input lines thereof are indicated by thin lines or medium lines, while output lines thereof are indicated by full lines. In FIG. 3, switching elements which receive signals of the input lines are arranged in portions with marks ○ among the points of intersection between the input lines and the output lines. In order to facilitate understanding of the notation of the ROMs in FIG. 3, A in FIG. 9 shows a ROM in the same notation as in FIG. 3, and B in FIG. 9 shows a circuit corresponding to A in FIG. 9. As apparent from FIG. 9, the ROM constructs a NOR circuit in effect.

Referring to FIG. 3, the ROM 17A is supplied with non-inverted output signals Q and inverted output signals $\overline{Q}$ of the binary counters BC1 to BC8 and a non-inverted output signal Q of the delay-type flip-flop circuit DFF5 through inverters G197 to G213 respectively, and it is also supplied with the signal of the line l9 directly and through an inverter G82.

Signals on the output lines $l_{121}$ and $l_{122}$ of the ROM 17A are applied to the input D of the delay-type flip-flop circuit DFF5 through the NOR circuit G57. An inverted output signal $\overline{Q}$ of the flip-flop circuit DFF5 is applied to the flip-flop circuits FF17 to FF24 as reset signals.

The count value of the counter 16 is controlled by the output signal on the line $l_{121}$ or $l_{122}$ of the ROM 17A. The line $l_{121}$ or $l_{122}$ is selected by the signal applied to the line l9, that is, the signal for appointing the television format.

When the signal on the line l9 is at the low level, the switching element at the point of intersection between the input line $l_{119}$ and output line $l_{121}$ of the ROM 17A becomes the "off" state. Simultaneously, the switching element at the point of intersection between the input line $l_{120}$ and output line $l_{122}$ becomes the "on" state owing to the high level output of the inverter G82. Under this condition, the signal level of the output line $l_{121}$ is determined by the combination of the output signals of the binary counters BC1 to BC8. On the other hand, the signal level of the output line $l_{122}$ becomes the low level irrespective of the output signals of the binary counters. That is, the output line $l_{121}$ is selected. In contrast, in case where the signal on the line l9 is at the high level, the output line $l_{122}$ is selected.

Figure 10:
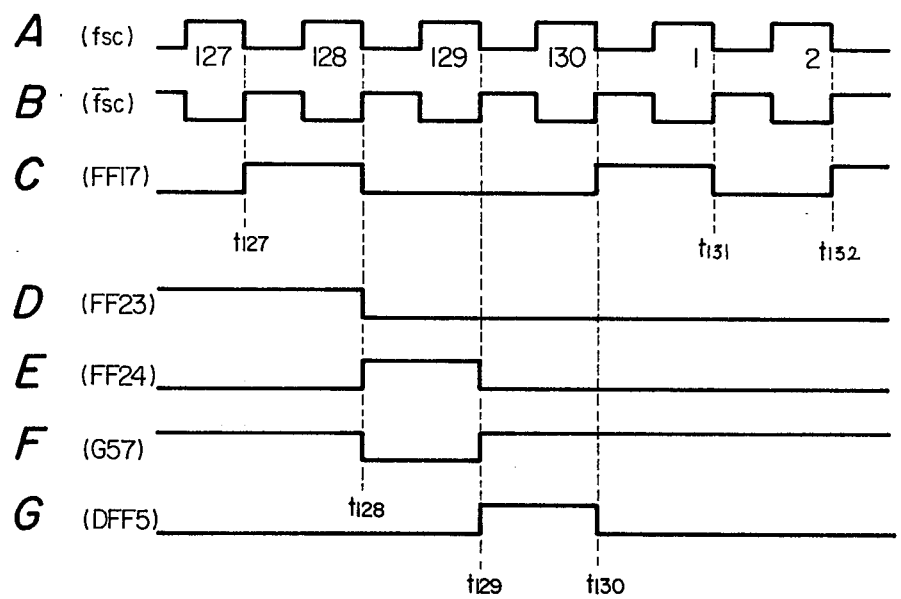
FIGS. 10 and 11 are timing charts of the circuit in FIG. 3.

FIG. 10 is a time chart of the counter 16 at the time when the line l9 is at the low level. In FIG. 10, letter A denotes the clock signal applied from the flip-flop circuit 15 (FIG. 1) to a line $l_{15}$, letter B an output signal from an inverter G58, letters C, D and E the non-inverted (Q) output signals of the flip-flop circuits FF17, FF23 (not shown) and FF24 respectively, letter F the output signal of the NOR cirucit G57, and letter G the inverted ($\overline{Q}$) output signal of the delay-type flip-flop circuit DFF5.

The flip-flop circuits FF17 to FF24 are reset in the initial state.

The respective output signals of the flip-flop circuits FF17 to FF24 are inverted by the negative edges of clock signals impressed on clock terminals C thereof.

The states of the flip-flop circuits FF17 to FF24 are changed by the clock signal impressed on the line $l_{15}$.

Upon fall of the 127th clock signal impressed on the line $l_{15}$ at a time $t_{127}$, the outputs Q of those FF17 to FF23 of the flip-flop circuits FF17 to FF24 are brought into the high level (logic value 1).

Upon fall of the 128th clock signal impressed on the line $l_{15}$ at a time $t_{128}$, the outputs Q of the flip-flop circuits FF17 to FF23 are brought into the low level (logic value 0), and the output Q of the flip-flop circuit FF24 is brought into the high level. Since the switching elements are arranged on the output line $l_{121}$ of the ROM 17A as illustrated in FIG. 3, the signal on this output line $l_{121}$ is brought into the high level. The output of the NOR circuit G57 is brought into the low level accordingly.

Upon fall of the clock signal, the delay-type flip-flop circuit DFF5 provides a signal which corresponds to an input signal preceding one clock period.

Accordingly, upon fall of the clock signal impressed on the line $l_{15}$ at a time $t_{129}$, the inverted output signal $\overline{Q}$ of the delay-type flip-flop circuit DFF5 is brought into the high level as shown at F in FIG. 10. The flip-flop circuits FF17 to FF24 are reset because their reset terminals R receive the high level signal from the flip-flop circuit DFF5.

When the 130th clock signal impressed on the line $l_{15}$ falls at a time $t_{130}$, the output of the delay-type flip-flop circuit DFF5 becomes the low level, and the reset of the flip-flop circuits FF17 to FF24 is released.

Thereafter, similar operations are repeated, with the result that the counter 16 operates as the divide-by-130 counter.

When the line $l_9$ is at the high level, the output line $l_{122}$ is the ROM 17A is selected, so that the counter 16 operates as the divide-by-141 counter.

The ROM 17A decodes the output signal of the counter 16, and supplies the lines $l_{123}$ to $l_{161}$ with various timing signals for forming the horizontal synchronizing signal and all signals associated therewith. Owing to the arrangement of the switching elements as shown, by way of example, a signal which is at the high level during the period of the 68th clock signal appears on the output line $l_{123}$.

In this embodiment, in order to make it possible to change the time interval of the timing signal at high precision, also the clock signal of the line $l_{15}$ is utilized as the input signal of the ROM 17A as shown in the drawing.

On, for example, the output line $l_{125}$ of the ROM 17A, the switching element which receives the clock signal of the line $l_{15}$ through the inverter G58 is arranged. As a result, this output line $l_{125}$ is supplied with a signal which becomes the high level during a half cycle from the 78.5th clock signal.

The various timing signals provided from the ROM 17A are supplied to the ROM 17B. The output timing signals of the ROM 17A are selected by the ROM 17B, and are delivered to the output lines $l_{171}$ to $l_{186}$.

In this case, combined timing signals are provided from the output lines, for example, $l_{171}$ on which a plurality of switching elements are arranged as shown.

Figure 5:
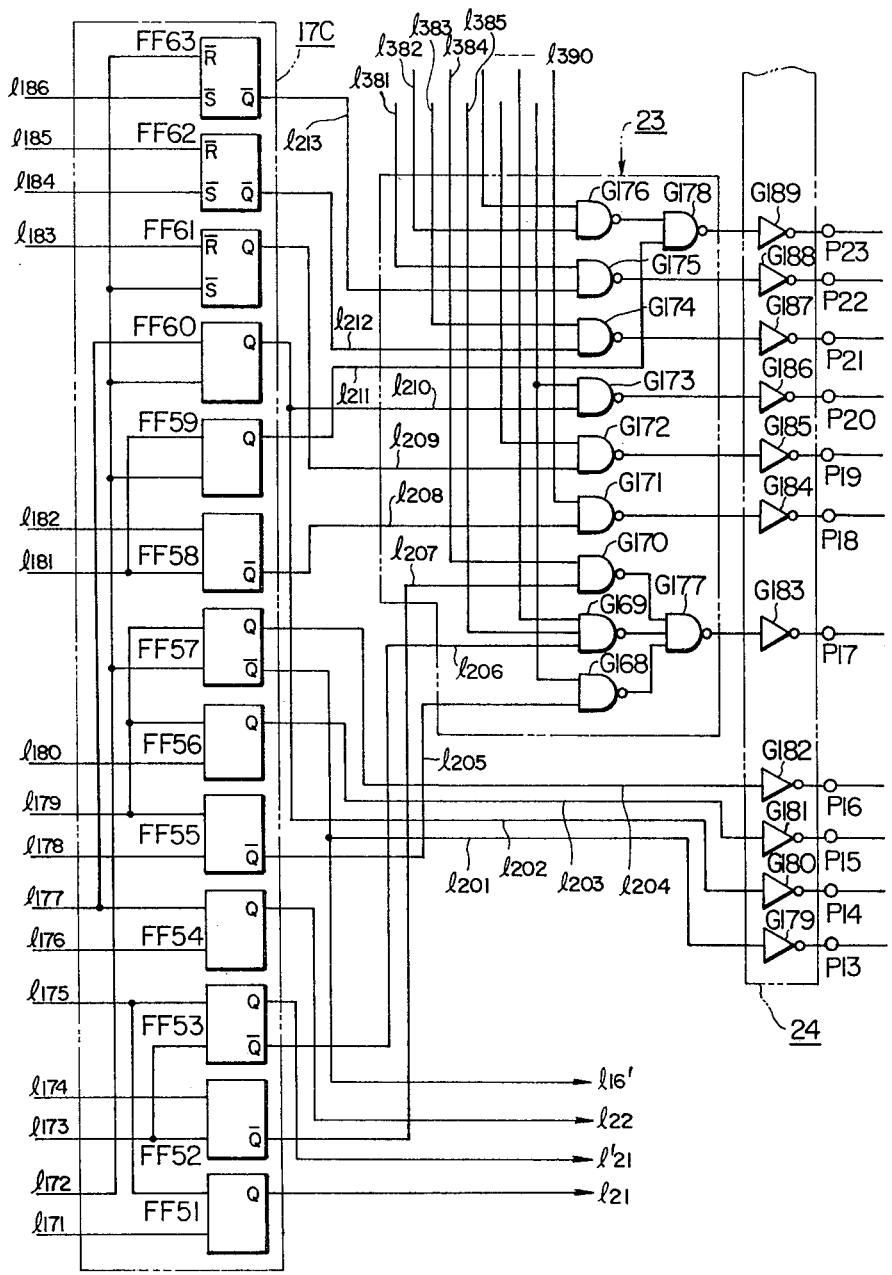

The output signals of the output lines $l_{171}$ to $l_{186}$ are supplied to the R-S flip-flop circuits FF51 to FF63 in FIG. 5. Each of the R-S flip-flop circuits FF51 to FF63 is set when the timing signal impressed on its set terminal $\overline{S}$ becomes the low level, and is reset when the timing signal impressed on its reset terminal $\overline{R}$ becomes the low level.

Since one period of the counter 16 is equal to one cycle of the horizontal synchronizing signal as described before, various signals required for horizontal synchronization are provided from the R-S flip-flop circuits FF51 to FF63.

The signal of a line $l_{21}$ which is supplied with a non-inverted output from the R-S flip-flop circuit FF51 is provided twice in one period of the counter 16. That is, the signal on the line $l_{21}$ has a frequency $2.f_H$. This signal on the line $l_{21}$ is used as a clock signal for a counter 25 to be described later. The signal of a line $l_{21}'$ which is supplied with a non-inverted output from the FF53 and the signal of a line $l_{16}'$ which is supplied with an inverted output from the FF57 are used as input signals for a field reset circuit 22 in FIG. 7 to be described later. The signal of a line $l_{22}$ which is supplied with a non-inverted output from the FF54 is used as an input signal for a phase detector circuit 20 to be described later.

Figure 4:
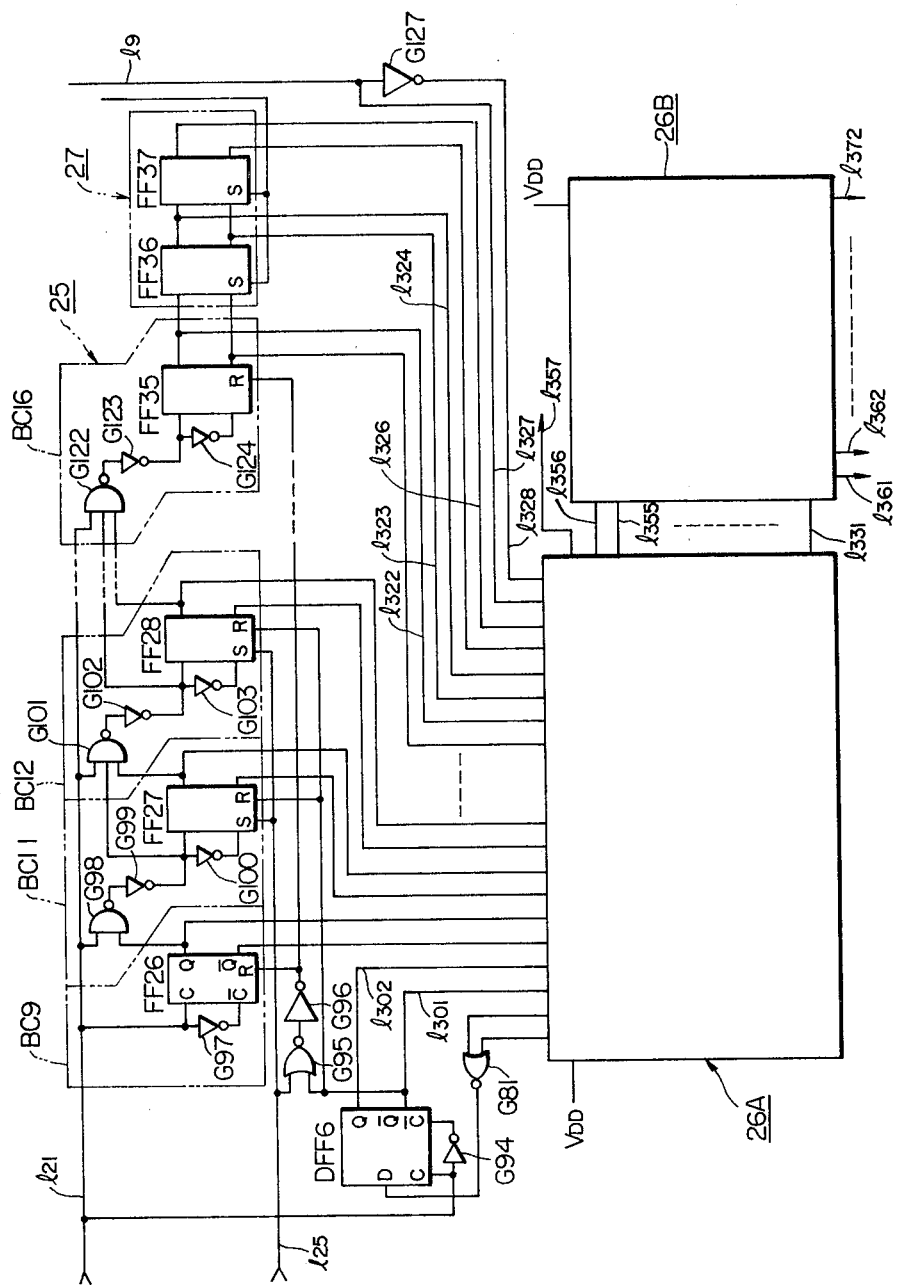

The counter 25 has a construction similar to that of the counter 16. As shown in FIG. 4, it is composed of binary counters BC9 to BC16, a delay-type flip-flop circuit DFF6, NOR circuits G81 and G95, inverters G94 and G96, and a part of a decoder 26. This counter 25 counts the clock signals of the frequency $2.f_H$ double line frequency of the horizontal synchronizing signal as are supplied from the flip-flop circuit FF51 through the line $l_{21}$.

The counter 25 operates as a divide-by-525 counter when the signal of the low level apppointing the NTSC format is applied to the line $l_9$, and as a divide-by-625 counter when the signal of the high level appointing the PAL format or the SECAM format is applied to the line $l_9$.

The counter 25 is reset into the initial state by receiving a signal from a vertical reset circuit 28 through a line $l_{25}$. The vertical reset circuit 28 will be described in detail later with reference to FIG. 6.

An output signal from the counter 25 is applied to the decoder 26. The decoder 26 is similar to the decoder 17, and is constructed of ROMs 26A and 26B and a group of R-S flip-flop circuits 26C in FIG. 6.

The decoder 26 also receives an output signal from a counter 27 of 2 bits for determining fields.

As is well known, in the NTSC format, 1 frame is constructed of 2 fields, and 1 picture is formed by 1 frame. In the PAL format and the SECAM format, 1 frame is constructed of 4 fields.

Therefore, the two kinds of the first field and the second field need to be distinguished in the NTSC format, and the four kinds of the first to fourth fields need to be distinguished in the PAL format and the SECAM format.

The field determining counter 27 is constructed so as to receive from the counter 25 a clock signal whose period is equal to the period of a vertical synchronizing signal. It provides the signal which corresponds to at most four fields as described above.

The decoder 26 receives the output signal provided from the counter 25 and having the period equal to that of the vertical synchronizing signal, and the field determining signal provided from the counter 27, and it provides various signals synchronous with the vertical synchronizing signal in the respective fields.

Parts of the synchronizing signals provided from the decoders 17 and 26 are applied to a decoder 23 which is constructed of NAND circuits G168 to G178 as shown in FIG. 5.

A composite signal, for example, is formed by means of this decoder 23.

The output signals of the decoders 17, 23 and 26 are applied to a group of buffer amplifiers 24 consisting of inverters G179 to G190. Various synchronizing signals are fetched through the terminals P13 to P24 from the group of buffer amplifiers 24.

The signal wave forms appearing on the above terminals are shown in FIGS. 18 and 19.

The signal of the frequency $2f_H$ as shown by A in FIGS. 18 and 19 is delivered from the binary counter 15 (FIG. 1), and the horizontal synchronizing signal as shown by B in FIGS. 18 and 19 appears on the terminal P16.

A camera horizontal drive signal, clamp pulse signal, vertical synchronizing signal, bust flag signal, and color blanking keyer signal, which are shown by C, D, E, F and G, respectively, in FIGS. 18 and 19, appear on the terminals P15, P14, P24, P18 and P19, respectively. While, a beam blanking signal, black gate pulse signal, identification pulse signal for SECAM, subcarrier blanking signal and composit synchronizing signal, which are shown by H, I, J, K and L, respectively, in FIGS. 18 and 19, appear on the terminals P20, P21, P22, P23 and P17, respectively.

In accordance with this embodiment, the phase detector circuit 20 for receiving an external synchronizing signal is used as shown in FIG. 1.

In order to synchronize the equipment employing the circuit of FIG. 1 with the horizontal synchronizing signal supplied externally, the external terminal P9 of the CMOSIC 1 and one end of the resistor R2 are coupled as indicated by a broken line.

The phase detector circuit 20 is supplied, on one hand, through the line $l_{22}$ with the signal delivered from the decoder 17 and synchronzed with the horizontal synchronizing signal, and on the other hand, through the external terminal P11 and a line $l_{23}$ with the horizontal synchronizing signal from another equipment such as television camera not shown.

Figure 11:
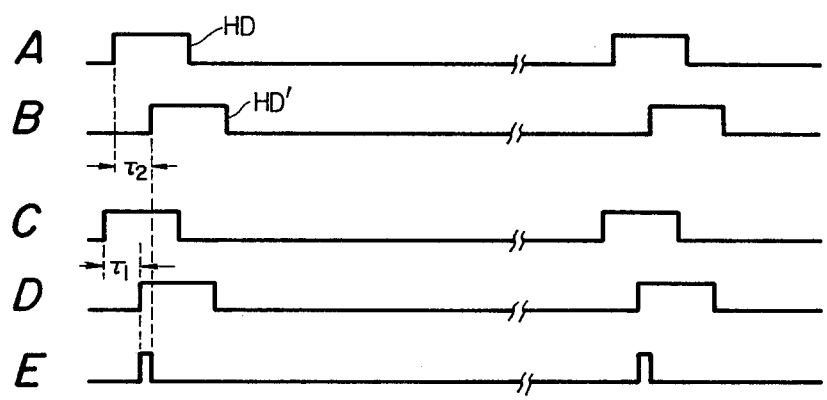

The signal which is supplied onto the line $l_{22}$ is illustrated at B in FIG. 11, while the horizontal synchronizing signal which is supplied to the external terminal P11 is illustrated at D in FIG. 11. Accordingly, a phase detection signal as shown at E in FIG. 11 is provided from the phase detector circuit 20.

The phase detection signal is converted into a D.C. signal by the low-pass filter 21. The D.C. signal is supplied through the external terminal P9 and the resistor R2 to the varactor diode VP1 within the crystal oscillator circuit 2.

Accordingly, the oscillation frequency of the crystal oscillator circuit 2 is controlled by the phase difference between the two input signals supplied to the phase detector circuit 20. The output signal of the crystal oscillator circuit 2 controls the oscillation frequency of the voltage-controlled oscillator circuit 13, and therefore controls the phase of the signal to be supplied from the decoder 17 to the line $l_{22}$. As a result, the phase of the signal to be fed to the line $l_{22}$ is brought into coincidence with the phase of the signal supplied to the external terminal P11.

In the external synchronization, however, the horizontal synchronizing signal provided from the other equipment (refer to C in FIG. 11) is fed to the external terminal P11 after a signal delay of a delay time $\tau_1$ arising in a signal transmission path such as cable, as illustrated at D in FIG. 11. The signal delay as above mentioned gives rise to a synchronization error between the other equipment and the equipment employing the circuit of FIG. 1.

In accordance with this embodiment, the switching elements as previously stated are properly arranged within the decoder 17, whereby the timing of the signal to be delivered from the decoder 17 to the line $l_{22}$ is appropriately set relative to the timing of the horizontal synchronizing signal to be provided from the decoder 17 as shown at A in FIG. 11.

As illustrated at B in FIG. 11, the signal to be delivered from the decoder 17 to the line $l_{22}$ is delayed a delay time $\tau_2$ substantially equal to the delay time $\tau_1$ with respect to the horizontal synchronizing signal shown at A in FIG. 11.

Thus, the phase detector circuit 20 is supplied with the signal delayed by the decoder 17 and the horizontal synchronizing signal delayed by the signal transmission path such as cable.

As a result, notwithstanding that the signal delay takes place in the signal transmission path, the synchronization error of the device of FIG. 1 with respect to the other equipment not shown can be reduced.

The delay of the signal for reducing the synchronization error as above described may well be effected by any other known delay means such as delay line and delay circuit, instead of the decoder 17.

However, in case where the signal delay is executed with the decoder 17 as described above, the delay time can be set comparatively easily by the proper arrangement of the switching elements as stated previously. Moreover, the circuit arrangement can be simplified because neither the delay line nor the delay circuit as referred to above is used.

In accordance with this embodiment, the operation of the crystal oscillator circuit 2 for producing the subcarrier signal is controlled by the circuit operations as described above, and hence, not only the synchronizing signal but also the subcarrier signal can be synchronized with the other equipment.

In this embodiment, the phase detector circuit 20 has a construction similar to that of the phase detector circuit 11 shown in FIG. 2. The phase detector circuit as shown in FIG. 2 includes an output circuit composed of the MOSFETs TR1 and TR2 which are caused to execute the switching operation in accordance with the phase difference of the two input signals for the phase detection as stated before. The MOSFETs TR1 and TR2 are held in the "off" states for the period during which neither of the two input signals is supplied. Therefore, the output circuit exhibits a high output impedance characteristic during the period. An inverter G37 in the low-pass filter 21 receiving the output of the output circuit exhibits a high input impedance characteristic when constructed of a MOSFET.

Accordingly, the output voltage level of the phase detector circuit 20 which has been determined by the phase difference between one external horizontal synchronizing signal supplied to the line $l_{23}$ through the external terminal P11 and one signal supplied to the line $l_{22}$ is held constant and undergoes no level change with the lapse of time for a comparatively long period of time until the next external horizontal synchronizing signal is supplied. The low-pass filter 21 provides a voltage signal of a level corresponding to the output voltage level of the phase detector circuit 20.

As a result, the phase of the oscillation output signal of the crystal oscillator circuit 2 is held constant without any level change with time during the period during which the horizontal synchronizing signal is not supplied.

The circuit arrangement of this embodiment can be made simpler than in case where an additional phase detector circuit for steadily detecting the phase difference between the subcarrier signal provided from the device of FIG. 1 and the subcarrier signal provided from another equipment is disposed and where the operation of the crystal oscillator circuit 2 is controlled on the basis of an output signal from the additional phase detector circuit.

In accordance with this embodiment, in order to synchronize an external vertical synchronizing signal and the vertical synchronizing signal in the device of FIG. 1, the counter 25 is reset into the initial state in conformity with the timing of the external vertical synchronizing signal. To the end of controlling the reset timing of the counter 25, the vertical reset circuit 28 is disposed.

As will be elucidated later, this circuit 28 receives a vertical synchronizing signal supplied from another equipment through the terminal P27 and the line $l_{24}$, a clock signal supplied from the decoder 17 through a line $l_{21}$ and various timing signals supplied from the decoder 26 through lines $l_{366}$, $l_{369}$ and $l_{370}'$ (refer to FIG. 6) and thereby provides the line $l_{25}$ with a signal of the high level for resetting the counter 25.

Likewise to the external horizontal synchronizing signal described before, the external vertical synchronizing signal which is applied to the terminal P27 is inevitably delayed a delay time which is decided by a cable (not shown) coupling this terminal P27 and a vertical synchronizing output terminal of the other equipment.

In accordance with this embodiment, in order to compensate for the delay time, in other words, to reduce a synchronization error attributed to the delay time, the counter 25 has its content made a predetermined number when reset by the vertical reset circuit 28.

The set number of the counter 26 at the resetting is made a value which substantially corresponds to the number of clock signals to be supplied to the counter 25 within the delay time. Although not especially restricted, the set number is made 6 (six).

Figure 6:
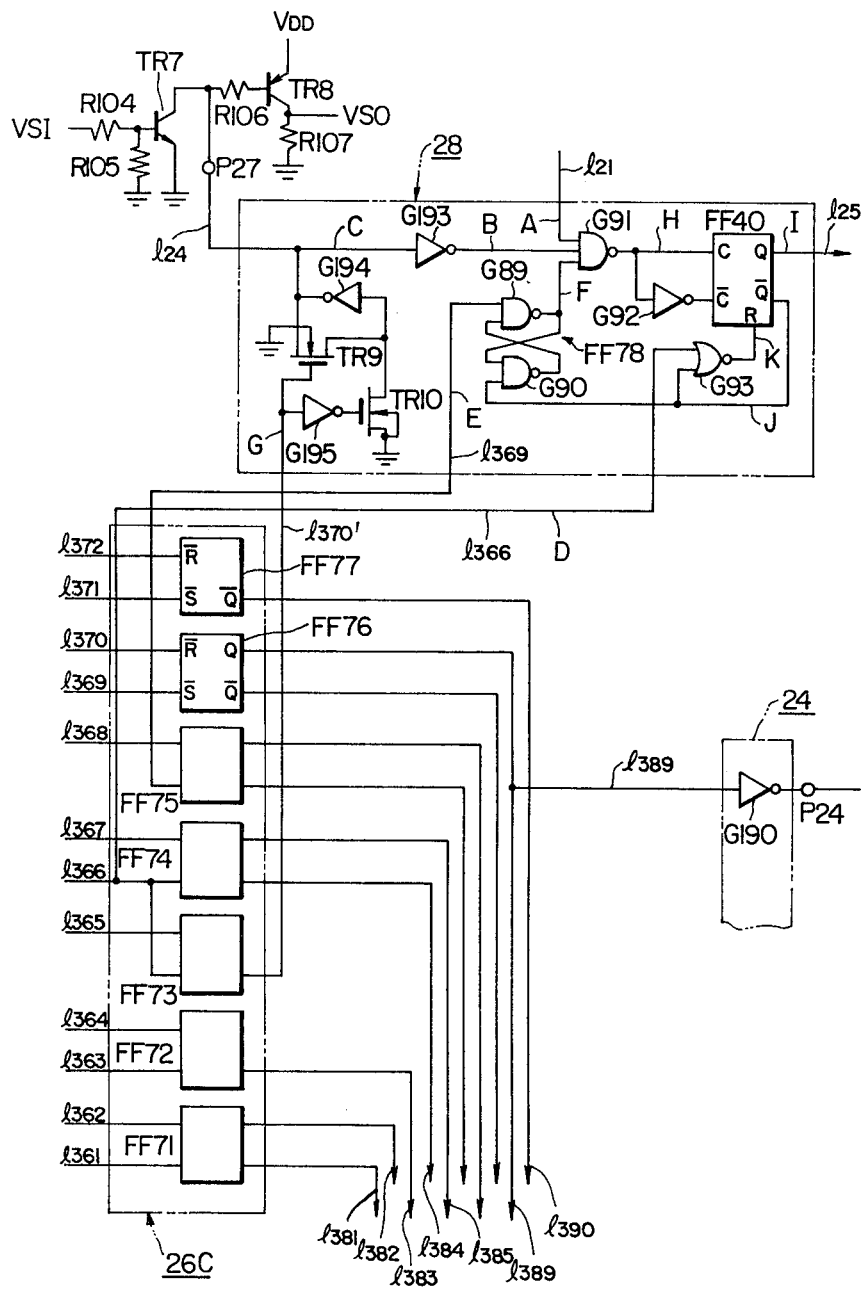
Figure 12:
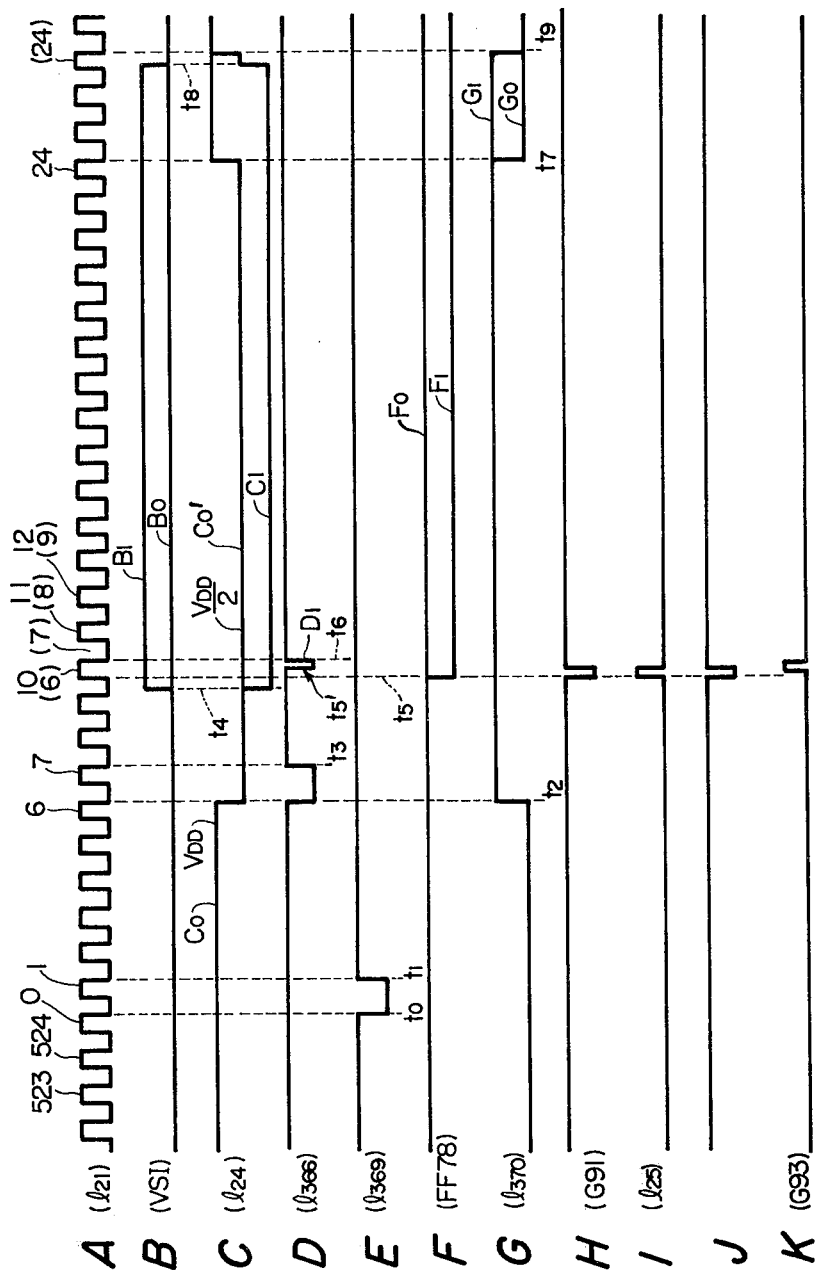
FIG. 12 is a timing chart of the circuit in FIG. 6.

FIG. 6 shows a detailed circuit diagram of the vertical reset circuit 28, while FIG. 12 shows an operating timing chart thereof.

The circuit 28 in FIG. 6 includes an input/output circuit which receives the external vertical synchronizing signal supplied through the terminal P27 and which supplies the terminal P27 with a signal synchronous with the internal vertical synchronizing signal. This input/output circuit is constructed of inverters G193 to G195 and MOSFETs TR9 and TR10.

Since the vertical reset circuit 28 includes the input/output circuit as described above, there are illustrated in FIG. 6 a circuit which serves to supply the signal to the terminal P27 and which is composed of resistors R104 and R105 and a transistor TR7 and a circuit which serves to receive the signal supplied to the terminal P27 and which is composed of resistors R106 and R107 and a PNP transistor TR8.

The input/output circuit is supplied with a control signal through the line $l_{370}'$ from the R-S flip-flop circuit FF73. The control signal which is supplied to the line $l_{370}'$ is held at the high level for a period of from time $t_2$ to time $t_7$ synchronous with the internal vertical synchronizing signal as illustrated at G in FIG. 12.

While the signal on the line $l_{370}'$ is held at the low level, the MOSFET TR9 of the input/output circuit is maintained in the "off" state and the MOSFET TR10 in the "on" state accordingly. An input voltage to the inverter G194 is made the low level substantially equal to the ground potential by means of the MOSFET TR10 lying in the "on" state.

In the above condition, unless the external vertical synchronizing signal is supplied to a terminal VSI, the transistor TR7 is in the "off" state. A potential on the line $l_{24}$ is made the high level substantially equal to a supply voltage ($V_{DD}$) by means of an output signal from the inverter G194. If the transistor TR7 is put into the "on" state by the external vertical synchronizing signal, the potential of the line $l_{24}$ is made the low level substantially equal to the ground potential by means of the transistor TR7.

When the signal on the line $l_{370}'$ is made the high level, the MOSFET TR9 is put into the "on" state and the MOSFET TR10 into the "off" state accordingly.

The input terminal of the inverter G194 is self-biased in such a way that the MOSFET TR9 is turned "on" as described above. The inverter G194 is appropriately designed in advance, and is constructed so as to provide an output voltage of a value substantially equal to a half of the supply voltage $V_{DD}$ in the self-biased state.

Accordingly, the signal on the line $l_{24}$ is varied as shown at C in FIG. 12 in response to the control signal supplied to the line $l_{370}'$ and the external vertical synchronizing signal supplied to the external terminal VSI.

More specifically, the signal on the line $l_{24}$ is changed from the high level substantially equal to $V_{DD}$ to the intermediate level equal to $V_{DD}/2$ when the signal supplied to the line $l_{370}'$ is changed from the low level to the high level at the time $t_2$ as shown at G in FIG. 12.

Unless the external vertical synchronizing signal is supplied, the signal on the line $l_{24}$ is returned from the intermediate level to the high level as shown by a curve $C0'$ at C in FIG. 12 in response to the fact that the signal on the line $l_{370}'$ is restored to the low level again at the time $t_7$.

When the external vertical synchronizing signal (not shown) supplied to the external terminal VSI is held at the high level for a period of from time $t_4$ to time $t_8$, the signal on the line $l_{24}$ is held at the low level substantially equal to the ground potential in response to the state of the first-mentioned signal as shown by a curve C1 at C in FIG. 12.

The signal on the line $l_{24}$ is supplied to the base of the PNP transistor TR8 through the terminal P27 and the resistor R106 on one hand, and to the input terminal of the inverter G193 on the other hand.

As a result, a binary signal which includes a part being inphase with the signal of the line $l_{370}'$ is delivered to the collector load resistor R107 of the PNP transistor TR8.

Figure 13:
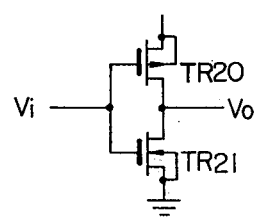
FIG. 13 is a circuit diagram of an inverter.
Figure 14:
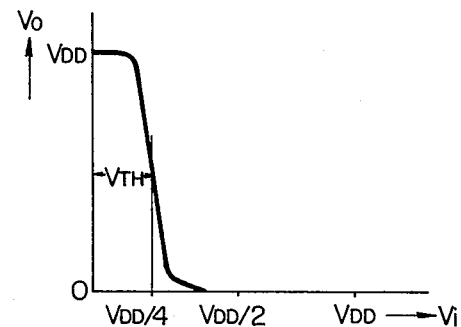
FIG. 14 is a diagram of the input/output characteristic curve of the circuit in FIG. 13.

The inverter G193 is constructed so as to have a logic threshold voltage lower than the low level output ($V_{DD}/2$) of the inverter G194, for example, a logic threshold voltage of $V_{DD}/4$. Although not especially restricted, the inverter G193 is composed of complementary MOSFETs TR20 and TR21 as shown in FIG. 13. In the circuit of FIG. 13, the input threshold voltage $V_{TH}$ can be set at a low level as shown in FIG. 14 by properly selecting the ratio of the mutual conductances of the two MOSFETs TR20 and TR21.

By setting the input threshold voltage as described above, the output signal of the inverter G193 can respond to the external vertical synchronizing signal as shown at B in FIG. 12.

More specifically, in case where the external vertical synchronizing signal is not supplied, the signal on the line $l_{24}$ is held at a level above the input threshold voltage of the inverter G193 by the inverter G194. As a result, the inverter G913 provides a signal of the low level.

In case where the external vertical synchronizing signal is supplied to the terminal VSI, the signal on the line $l_{24}$ is held at a level below the input threshold voltage of the inverter G193. As a result, the inverter G193 provides a signal of the high level.

The output signal of the inverter G193 is supplied to one input terminal of a NAND circuit G91.

Another input terminal of the NAND circuit G91 is supplied with the clock signal of the frequency $2.f_H$ as shown at A in FIG. 12 through the line $l_{21}$, and still another input terminal is supplied with a control signal as shown at F in FIG. 12 from an R-S flip-flop circuit FF78.

An output signal from the NAND gate G91 is supplied to the trigger terminals C and $\overline{C}$ of a flip-flop circuit FF40 directly and through an inverter G92, respectively.

The flip-flop circuit FF40 is triggered by the trailing edge of the trigger signal supplied to the trigger terminal C.

A non-inverted output Q from the flip-flop circuit FF40 is supplied to the reset terminal of the counter 25 through the line $l_{25}$, while an inverted output $\overline{Q}$ is supplied to a NOR circuit G93 and the R-S flip-flop circuit FF78.

The NOR circuit G93 is disposed in order to determine the pulse width of the signal which is provided from the flip-flop circuit FF40. Accordingly, the output terminal of the NOR circuit G93 is connected to the reset terminal of the flip-flop circuit FF40 as shown in FIG. 6.

One input terminal of the NOR circuit G93 is supplied through the line $l_{366}$ with an output signal from the ROM 26B in FIG. 4.

The signal which is supplied from the ROM 26B to the line $l_{366}$ is made the low level when the counter 25 is reset into the initial state.

As shown in FIG. 6, the R-S flip-flop circuit FF78 is constructed to NAND circuits G89 and G90. The R-S flip-flop circuits FF71 to FF77 and the R-S flip-flop circuit FF78 have the same construction.

The R-S flip-flop circuit FF78 is used in order to inhibit a plurality of pulse signals from being provided from the NAND circuit 91 in one cycle of the vertical synchronizing signal. To this end, the R-S flip-flop circuit FF78 is periodically set by the signals fed through the line $l_{369}$ from the ROM 26B of FIG. 4 and is reset by the inverted output $\overline{Q}$ of the flip-flop circuit FF40. Although not especially restricted, the signal on the line $l_{369}$ is brought into the low level at the content 0 (zero) of the counter 25, that is, in the first clock signal cycle in the vertical synchronization as shown at E in FIG. 12.

Accordingly, the operations of the circuit in FIG. 6 and the aforecited various circuits become as follows.

First of all, one vertical period is initiated at a time $t_0$. At the time of the initiation of the vertical period, the count number of the counter 25 is 0 (zero).

The count value of the counter 25 is successively increased by the clock signals of the frequency $2.f_H$ shown at A in FIG. 12 as supplied from the decoder 17 at respective times after the time $t_0$.

In accordance with the count values of the counter 25, the signals on the lines $l_{369}$, $l_{370}'$, $l_{366}$ and $l_{24}$ are varied as shown at E, G, D and C in FIG. 12 respectively.

At the time $t_4$, the external vertical synchronizing signal is supplied to the external terminal VSI. This external vertical synchronizing signal renders the output signal of the inverter G913 the high level at substantially the same time as the aforecited time as shown at B in FIG. 12.

Since the output signal of the inverter G193 has been made the high level by the external vertical synchronizing signal as described above, the output signal of the NAND circuit G91 is brought into the low level as shown at H in FIG. 12 at a time $t_5$ synchronous with the clock signal at A in FIG. 12.

The flip-flop circuit FF40 is triggered by the trailing edge of the output signal of the NAND circuit G91. As a result, the non-inverted output $\overline{Q}$ of the flip-flop circuit FF40 is brought into the high level as shown at I in FIG. 12, and the inverted output Q into the low level as shown at J in FIG. 12.

The R-S flip-flop circuit FF78 is reset by the inverted output $\overline{Q}$ of the flip-flop circuit FF40, and therefore provides a low level signal as shown by a curve $F_1$ at F in FIG. 12.

As a result, the output signal of the NAND circuit G91 is rendered the high level again as shown at H in FIG. 12. At the output of the inverter G193, noise as correspond to undesirable noise applied to the terminal VSI or P27 appear. The NAND circuit G91 is prevented from responding to the noise in such a way that the R-S flip-flop circuit FF78 is reset as described above.

As set forth before, the counter 25 is reset into the initial state when the signal on line $l_{25}$ has been made the high level by the triggering of the flip-flop circuit FF40. The reset number of the counter 25 is 6 (six) as stated previously. Accordingly, the signal which is supplied from the decoder 26 to the line $l_{366}$ is brought into the low level again as shown at D in FIG. 12 at a time $t_5'$ at which the counter 25 is reset.

Since the inverted output $\overline{Q}$ of the flip-flop circuit FF40 brought into the set state is at the low level, the NOR circuit G93 provides a high level signal as shown at K in FIG. 12 under the condition that the signal to be supplied to the line $l_{366}$ is made the low level as described above.

The high level signal of the NOR circuit G93 resets the flip-flop circuit FF40.

As a result, the reset of the counter 25 is released.

Accordingly, upon fall of the clock signal at A of FIG. 12 at a time $t_6$, the count value of the counter 25 is increased with respect to the set number at the above reset. Owing to the increase of the count value of the counter 25, the signal which is supplied from the decoder 26 to the line $l_{366}$ is made the high level again as shown at D in FIG. 12.

At the time $t_8$, the external vertical synchronizing signal is restored to the low level. In response to this external vertical synchronizing signal, the output signal of the inverter G193 is made the low level again as seem from B in FIG. 12.

Upon resetting of the counter 25 at the time $t_5$, the signal which is supplied from the R-S flip-flop circuit FF73 of the decoder 26 to the line $l_{370}'$ is held at the high level till a time $t_9$ as shown by a curve $G_1$ at G in FIG. 12.

In accordance with this embodiment, a binary counter 18 receiving the horizontal synchronizing signal from the counter 16 and a line switch circuit 19 are used. An output from the binary counter 18 controls the transfer gate 6 in case of the PAL format, and also controls the field reset circuit 22.

Figure 7:
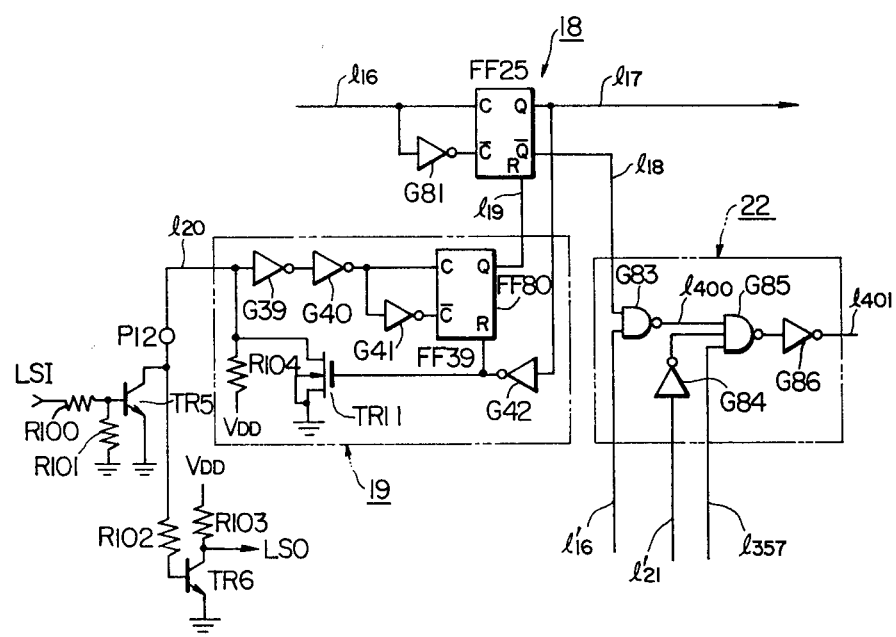

A detailed circuit diagram of the binary counter 18 as well as the line switch circuit 19 is shown in FIG. 7.

Referring to FIG. 7, the binary counter 18 is constructed of a flip-flop circuit FF25 and an inverter G81. A line $l_{16}$ is supplied with the output signal of the counter 16 in FIG. 3. An output signal from the flip-flop circuit FF25 is applied to the gate circuit 14 (FIG. 1) through a line $l_{17}$.

The line switch circuit 19 is constructed of a flip-flop circuit FF80, inverters G39 to G42, and an N-channel MOSFET TR11. This line switch circuit 19 has an input/output terminal which is connected to the external terminal P12 of the IC.

As shown in the figure, the terminal P12 has connected thereto a circuit which serves to receive through a terminal LSI a signal provided from another equipment and which is composed of a transistor TR5 and resistors R100 and R101, and a circuit which serves to deliver a signal to another equipment through a terminal LSO and which is composed of a transistor TR6 and resistors R102 and R103.

Regarding the terminals LSI and LSO, only one of them is used.

In case where the operation of the circuit of FIG. 7 is controlled by another device not shown, a terminal like the terminal LSO as disposed in the other device is coupled with the terminal LSI. Conversely, in case where the operation of another device not shown is controlled by the signal supplied to the terminal LSO, the terminal LSO is coupled with a terminal like the terminal LSI as disposed in the other device.

The operation of the circuit of FIG. 7 becomes as follows.

The flip-flop circuit FF25 in the binary counter 18 receives through the line $l_{16}$ the trigger signal which is provided from the counter 16 of FIG. 3 every horizontal period. Accordingly, signals which are inverted every horizontal period are provided at the non-inverting output terminal Q and inverting output terminal $\overline{Q}$ of the flip-flop circuit FF25.

The signal provided at the non-inverting output terminal Q of the flip-flop circuit FF25 is supplied to the terminal P12 through an inverter which is composed of the inverter G42, the MOSFET TR11 and a load resistor R104 of the MOSFET. The signal supplied to the terminal P12 is fed to the terminal LSO through the transistor TR6.

The signal which is fed to the output terminal LSO is made the opposite phase to the signal which is provided from the non-inverting output terminal Q of the flip-flop circuit FF25.

A signal which is supplied from the line switch circuit 19 to a line $l_{19}$ is maintained at the low level when the terminal LSI is maintained at the low level or when the signal supplied to the terminal LSI from the terminal like the terminal LSO as disposed in the other device is synchronized with the output signal provided from the flip-flop circuit FF25.

More specifically, in case where the signal at the non-inverting output terminal Q of the flip-flop circuit FF25 (hereinbelow, written "Q of FF25" or the like) is held at the low level, the output of G42 is made the high level, and hence, FF80 is reset. The output of G42 renders the output of G40 the low level.

When Q of FF25 is made the high level, the output of G42 is made the low level, so that the reset of FF80 is released.

In the release of the reset, the output signal of G40 or the trigger input signal of FF80 is varied as below.

First, in case where TR5 is steadily held in the "off" state with the terminal LSI being open, a signal on a line $l_{20}$ is changed by only an inverter composed of R104 and TR11. Accordingly, the output signal of G40 is brought into the high level in response to the output signal of G42.

Secondly, in case where the terminal LSI is coupled to the terminal like the terminal LSO as disposed in the other device not shown, the signal on the line $l_{20}$ is determined by TR5 as well as the aforecited inverter composed of R104 and TR11. In this case, the circuit of FIG. 1 is synchronized with the other device by the external horizontal synchronizing signal supplied to the terminal P11. The terminal like the terminal LSO as disposed in the other device is supplied with a signal which changes from the high level to the low level at substantially the same time as the time when Q of FF25 in FIG. 7 is brought into the high level. The signal supplied to the terminal of the other device is fed to the terminal LSI after having been delayed by a cable or the like. The signal on the line $l_{20}$ is put into the high level under the condition that TR5 is brought into the "off" state. Accordingly, the output signal of G40 is made the high level after a delay time which is substantially drtermined by the cable or the like.

FF80 is not triggered by the leading edge of the output signal of G40. Accordingly, Q of FF80 is left at the low level.

Subsequently, when Q of FF25 is returned from the high level to the low level again, FF80 is supplied with a reset signal from G42. The output signal of G40 is caused to fall from the high level to the low level in response to the output signal of G42. In this case, FF80 receives the reset signal from G42 as described above, and hence, it is not triggered even by the fall of the output signal of G40.

When the signal applied to the terminal like the terminal LSO is disposed in the other device not shown is asynchronous with Q of FF25, the operation of the line switch circuit 19 becomes as below.

When Q of FF25 is put into the high level by the signal supplied to the line $l_{16}$, the reset of FF80 is released as stated previously. MOSFET TR11 is brought into the "off" state.

The other device provides a signal which is changed from the low level to the high level at substantially the same timing as the timing when Q of FF25 is rendered the high level. The output signal of the other device is supplied to the terminal LSI after having been delayed by a cable or the like.

Accordingly, TR5 is shifted from the "off" state into the "on" state after Q of FF25 has been made the high level.

The signal on the line $l_{20}$ is made the high level in response to the change of Q of FF25 to the high level, and is thereafter made the low level by TR5. The output signal of G40 undergoes the same change as that of the signal on the line $l_{20}$.

FF80 is triggered by the trailing edge of the output signal of G40. FF25 is reset under the condition that Q of FF80 is made the high level.

As a result, the synchronism between the other device and FF25 in FIG. 7 is established.

The output Q of the flip-flop circuit FF25 is supplied to the transfer gate 6 through the gate 14 in FIG. 1. The gate 14 has its operation controlled by a signal which is supplied through the terminal P28. As described before, the gate 14 is constructed so as to provide a signal of either level, for example, the high level irrespective of the output Q of the flip-flop circuit FF25 when the signal of the terminal P28 is at the low level or indicates the NTSC format, and to provide a signal alternately becoming the high level and the low level in accordance with the output Q of the flip-flop circuit FF25 when the signal of the terminal P28 is made the high level indicative of the PAL format.

As stated previously, in the television, one field is constructed of one vertical period. One frame of a picture is constructed of four fields in the PAL format and two fields in the NTSC format.

As is well known, the phases of a horizontal synchronizing signal and a vertical synchronizing signal are varied in the respective fields constituting one frame, and hence, means for indicating the respective fields becomes necessary.

In this embodiment, the field determining counter 27 which can be shared for the respective formats of the NTSC format, PAL format and SECAM format is used.

As shown in FIG. 4, the field determining counter 27 is constructed of two flip-flop circuits FF36 and FF37 which are connected in series. The count value of the field counter 27 is renewed one per vertical period by means of the output signal of the counter 25.

Accordingly, the respective fields can be caused to correspond to the outputs Qs of the flip-flop circuits FF36 and FF37 as in the following table:

TABLE

| Field | Output Q (FF36) | Q (FF37) |
|---|---|---|
| 1 | L | L |
| 2 | H | L |
| 3 | L | H |
| 4 | H | H |

In the table, L denotes the low level, and H the high level.

The respective output signals of the field counter 27 are supplied to the ROM 26A through lines $l_{323}$ to $l_{326}$.

Upon receiving the output signals of the counters 25 and 27, the ROM 26A provides the signals in the respective fields.

In this case, the fields required in the NTSC system are only two as described previously. The ROM 26 is therefore put into a construction wherein in case where the signal fed from the terminal P28 through the line $l_9$ has the level appointing the NTSC format, the first field and the third field indicated by the field counter 27 are regarded as the same field, while the second field and the fourth field are regarded as the same field.

As stated before, the circuit of this embodiment can be synchronized with the external horizontal synchronizing signal and the external vertical synchronizing signal.

In such external synchronization operation, also the field counter 27 needs to be synchronized with the other device not shown.

To this end, the embodiment is provided with the field reset circuit 22. The field reset circuit 22 provides a signal for resetting the field counter 27, in accordance with the phases of various signals having been synchronized with the respective external synchronizing signals as described below.

The field reset circuit 22 is constructed to NAND circuits G83, G85 and G86 and an inverter G84 as shown in FIG. 7. It receives the signals to be described below at lines $l_{18}$, $l_{16}'$, $l_{21}'$ and $l_{357}$, and thereby supplies a line $l_{401}$ with the signal for resetting the field counter 27 (FF36, FF37) in FIG. 4.

Figure 15:
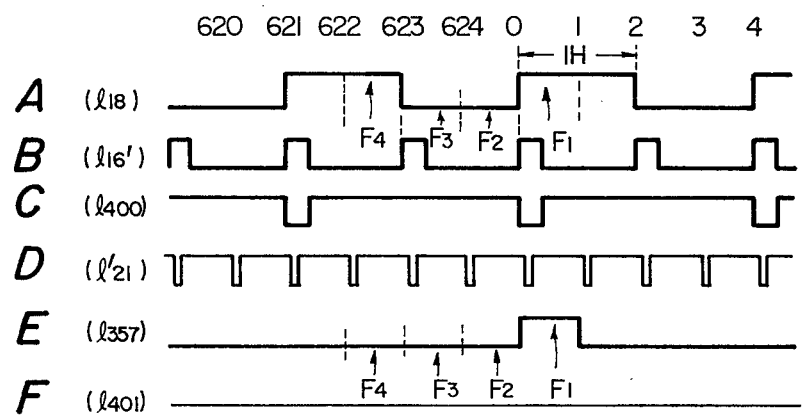
FIGS. 15, 16A, 16B and 16C are timing charts of the circuit in FIG. 7.

The line $l_{18}$ is fed from the flip-flop circuit FF25 with a signal which is inverted at intervals of one horizontal period (1 H) as shown at A in FIG. 15. If there is the external synchronizing signal on account of the circuit operation as described previously, the signal on the line $l_{18}$ is synchronized therewith.

The line $l_{16}'$ is fed from the flip-flop circuit FF5 in FIG. 5 with a signal which is held at the high level for a predetermined time from the initiation of each horizontal period as shown at B in FIG. 15.

The line $l_{21}'$ is fed from the R-S flip-flop circuit FF53 in FIG. 5 with a signal as shown at D in FIG. 15. The signal has a frequency $2.f_H$, and is made the low level in the period during which the signal on the line $l_{16}'$ is held at the high level.

The line $l_{357}$ is fed from the ROM 26A in FIG. 4 with a signal as shown at E in FIG. 15. The signal to be supplied to the line $l_{357}$ is held at the high level while the count values of the counter 25 and the field counter 27 are 0 (zero), that is, for one clock period defined to be the first field.

The counter 25 which counts the pulses of the signal of the frequency $2.f_H$ is made an odd counter conforming with the television format, for example, a divide-by-625 counter in case of the PAL format and a divide-by-525 counter in case of the NTSC format. On the other hand, the signal on the line $l_{18}$ is inverted every horizontal period as shown at A in FIG. 15. Accordingly, the timing at which the counter value of the counter 25 is returned to zero changes every field. More specifically, in the first field, the count value of the counter 25 is made zero in a period $F_1$ during which the signal on the line $l_{18}$ rises as seen from A of FIG. 15. In the second field, the count value of the counter 25 is made zero in a period immediately before the signal on the line $l_{18}$ rises. Similarly, in the third and fourth fields, the count value of the counter 25 is made zero at timings $F_3$ and $F_4$ of the signal on the line $l_{18}$ respectively.

In accordance with the phase difference between the signal on the line $l_{18}$ and the signal on the line $l_{357}$ as described above, the field reset circuit 22 operates as stated below.

In the following description, for the sake of convenience, the part $F_1$ of the signal on the line $l_{18}$ shall be termed the first field of the horizontal period. Likewise, the part $F_4$ shall be termed the fourth field of the horizontal period.

In case where, as shown in FIG. 15, the line $l_{357}$ is supplied with the high level signal in the first field $F_1$ of the horizontal period, the field reset circuit 22 provides the line $l_{401}$ with a signal which remains at the low level as shown at F in FIG. 15. In this case, the count value of the field counter 27 is successively renewed in accordance with the signal pulses provided from the counter 25.

In case where the content of the field counter 27 is not a correct state, the circuit operates as follows.

Figure 16A:
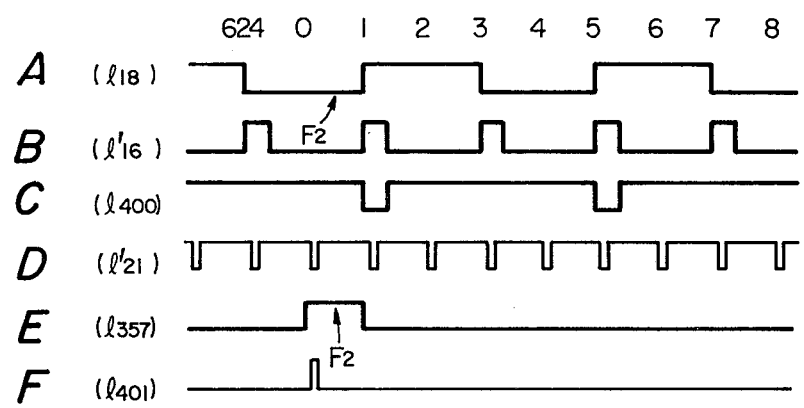

In case where the count value of the field counter 27 leads in an amount of one field, the line $l_{357}$ is supplied with a signal which is held at the high level in the second field F₂ of the horizontal period as shown at E in FIG. 16A. As a result, a signal which becomes the high level as shown at F in FIG. 16A is provided from the field reset circuit 22 to the line l₄₀₁. The field counter 27 is reset by the signal of the line l₄₀₁, and the content of the counter 27 comes to indicate the fourth field.

After one vertical period from the aforecited reset, the count value of the field counter 27 is renewed from the fourth field to the first field. Since the timing at which the counter 25 becomes zero changes in succession as stated previously, the signal on the line l₃₅₇ becomes the high level in the third field F₃ of the horizontal period as shown at E in FIG. 16B. At this time, a pulse signal is provided from the field reset circuit 22 again as shown at F in FIG. 16B.

Figure 16B:
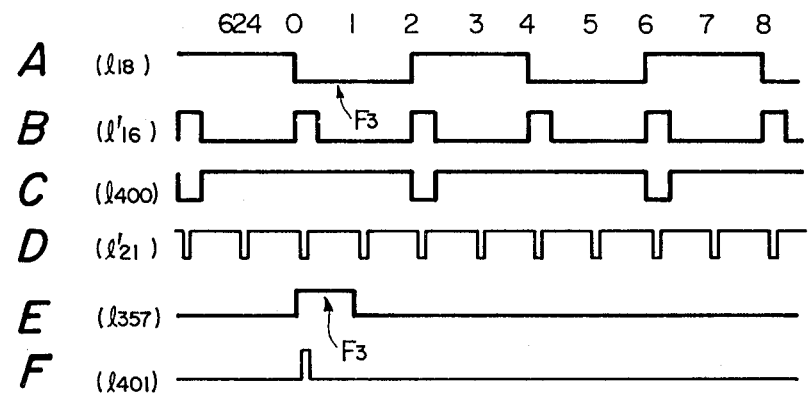
Figure 16C:
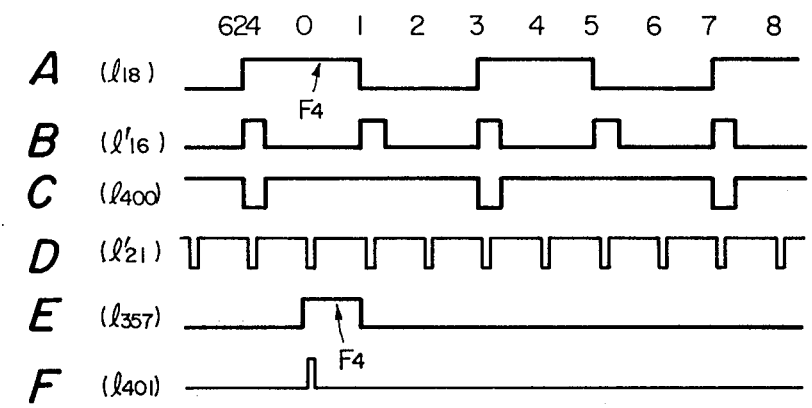

After one vertical period from the state of FIG. 16B, the field determining flip-flop circuit comes to indicate the first field again. On the line l₃₅₇, a signal which is held at the high level in the fourth field F₄ of the horizontal period as shown at E in FIG. 16C is provided. The field reset circuit 22 provides a pulse signal as shown at F in FIG. 16C.

After one vertical period from the state of FIG. 16C, the field determining flip-flop circuit 27 is renewed so as to indicate the first field. The l₃₅₇ is supplied with a signal which becomes the high level in the first frame of the horizontal period. The state of the circuit after one vertical period is the same as in FIG. 15, so that any pulse signal is not provided from the field reset circuit 22.

Figure 17:
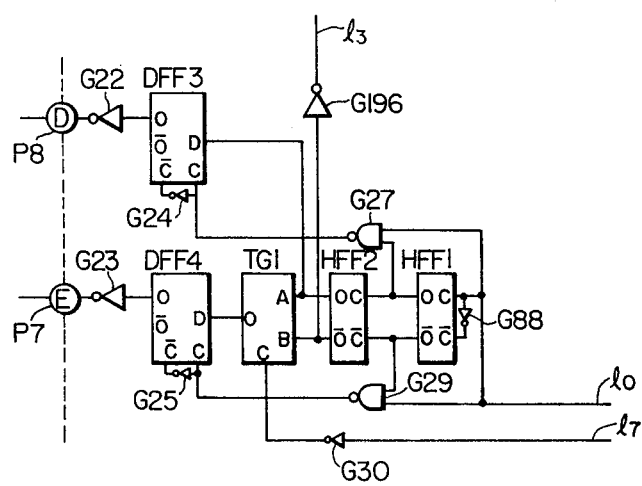
FIG. 17 is a circuit diagram of another embodiment.

FIG. 17 shows a circuit which can be substituted for the flip-flop circuits 3 and 4 in FIG. 1. In FIG. 17, lines l₀, l₃, l₇ etc. of the same symbols correspond to the lines of FIG. 1. In FIG. 17, HFF1 and HFF2 designate flip-flop circuits, DFF3 and DFF4 delay-type flip-flop circuits, TG1 a transfer gate circuit, G22 to G25, G30 and G196 inverters, and G27 and G29 NAND circuits.

What is claimed is:

1. A synchronizing signal generator device for television comprising a first signal generator circuit which provides a first reference signal of a subcarrier frequency or a frequency which is an integral number times said subcarrier frequency, a first counter which receives said first reference signal of said first signal generator circuit, a second signal generator circuit which provides a second reference signal, the frequency of said second reference signal being controlled by a control signal, a second counter which receives said second reference signal of said second signal generator circuit, a phase detector circuit which detects the phase difference between the output signals of said first and second counters and which provides the control signal for said second signal generator circuit, and a signal processor circuit which receives the output of said second signal generator circuit and which forms a horizontal synchronizing signal, including means for making the count numbers of said first and second counters variable, thereby making it possible to selectively generate synchronizing signals of the NTSC format, the PAL format and the SECAM format.

2. A synchronizing signal generator device for television as defined in claim 1, wherein said signal processor circuit includes a counter circuit which receives the output signal of said second signal generator circuit as a count signal and whose count number is altered in conformity with the NTSC format and with the PAL format or the SECAM format, a read only memory which receives the input of said counter circuit and an output of said counter circuit, thereby to provide a signal of a desired timing, and an R-S flip-flop circuit which receives the output from said read only memory.

3. A synchronizing signal generator device for television as defined in claim 1, wherein said signal processor circuit includes means for producing a second horizontal synchronizing signal which is delayed in time with respect to the first-mentioned horizontal synchronizing signal formed thereby, wherein said first signal generator circuit includes means responsive to a second control signal for controlling the phase of the output reference signal thereof, and further comprising a second phase detector circuit which receives said second horizontal synchronizing signal of said signal processor circuit and an external horizontal synchronizing signal and detects the phase difference between these signals and which provides said second control signal for said first signal generator circuit.

4. A synchronizing signal generator device for television as defined in claim 1, wherein said signal processor circuit includes a counter circuit which receives a horizontal synchronizing signal or a signal synchronous with said horizontal synchronizing signal, and a circuit which receives output pulses of said counter circuit and provides a vertical synchronizing signal in accordance with a count number thereof, said counter circuit receives an external vertical synchronizing signal thereby to be reset to a count number substantially corresponding to a delay time of said external vertical synchronizing signal.

5. A synchronizing signal generator device for television characterized by including a signal generator circuit which provides a reference signal of a frequency being integral times a subcarrier frequency, a subcarrier signal generator circuit which receives said reference signal and counts pulses thereof, thereby to provide first and second subcarrier signals of phases different from each other, first signal delay means to receive said first subcarrier signal, and second signal delay means to receive said second subcarrier signal, operations of said first and second signal delay means being controlled with said reference signal, thereby to obtain the first and second phase-compensated subcarrier signals from said first and second signal delay means.

6. A synchronizing signal generator device for television as defined in claim 5, wherein said subcarrier signal generator circuit is adapted to further provide a third subcarrier signal, and gate means to select said second and third subcarrier signals in accordance with broadcast formats is inserted between said subcarrier signal generator circuit and said signal delay means.

7. A synchronizing signal generator device for television as defined in claim 6, including a flip-flop circuit whose state is inverted by a horizontal synchronizing signal from the signal processor circuit, said gate means being controlled by an output of said flip-flop circuit at the PAL broadcast.

8. A synchronizing signal generator device for television as defined in claim 7, wherein said flip-flop circuit is reset or set by a horizontal synchronizing signal supplied externally.

9. A synchronizing signal generator device for television as defined in claim 1, wherein said signal processor circuit includes a field determining flip-flop circuit which receives a vertical synchronizing signal formed internally or a signal synchronous with said vertical synchronizing signal, and said field determining flip-flop circuit is reset by an external synchronizing signal.

* * * * *